United States Patent
Fu et al.

(10) Patent No.: US 12,349,133 B2
(45) Date of Patent: Jul. 1, 2025

(54) INFORMATION TRANSMISSION METHOD AND APPARATUS, AND DEVICE AND STORAGE MEDIUM

(71) Applicant: GUANGDONG OPPO MOBILE TELECOMMUNICATIONS CORP., LTD., Dongguan (CN)

(72) Inventors: Zhe Fu, Dongguan (CN); Cong Shi, Dongguan (CN); Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 394 days.

(21) Appl. No.: 18/089,259

(22) Filed: Dec. 27, 2022

(65) Prior Publication Data

US 2023/0199760 A1 Jun. 22, 2023

Related U.S. Application Data

(63) Continuation of application No. PCT/CN2020/106878, filed on Aug. 4, 2020.

(51) Int. Cl.
*H04W 72/1268* (2023.01)
*H04L 1/1812* (2023.01)

(52) U.S. Cl.
CPC ....... *H04W 72/1268* (2013.01); *H04L 1/1812* (2013.01)

(58) Field of Classification Search
CPC .............. H04W 72/1268; H04W 72/02; H04L 1/1812; H04L 1/1822; H04L 1/1854;
(Continued)

(56) References Cited

U.S. PATENT DOCUMENTS

2018/0199381 A1 7/2018 Rong et al.
2020/0275475 A1* 8/2020 Bhattad .................... H04L 1/18
(Continued)

FOREIGN PATENT DOCUMENTS

CN 109923935 A 6/2019
CN 110574332 A 12/2019
(Continued)

OTHER PUBLICATIONS

Guangdong Oppo Mobile Telecommunications Corp., Ltd., EP20948855.0, Extended European Search Report, Aug. 24, 2023, 8 pgs.
(Continued)

*Primary Examiner* — Liem H. Nguyen
(74) *Attorney, Agent, or Firm* — Morgan, Lewis & Bockius LLP

(57) ABSTRACT

Provided in the embodiments of the present application are an information transmission method and apparatus, a device, and a storage medium. The method includes: receiving downlink information from a network device, the downlink information including at least one of: configuration information of at least one CG resource and indication information for an autonomous transmission mode; determining, according to the downlink information, an autonomous transmission mode for a target object, and performing an uplink transmission based on the autonomous transmission mode. The target object is any one of: a terminal device, a MAC entity, a cell group, a HARQ process, and a CG resource.

14 Claims, 6 Drawing Sheets

(58) Field of Classification Search
CPC ... H04L 1/1887; H04L 5/0092; H04L 5/0094; H04L 5/0053

See application file for complete search history.

(56) References Cited

U.S. PATENT DOCUMENTS

| | | | |
|---|---|---|---|
| 2021/0007002 A1* | 1/2021 | Kang | H04W 4/70 |
| 2021/0297188 A1* | 9/2021 | Xu | H04L 1/1822 |
| 2021/0307057 A1* | 9/2021 | Baek | H04W 76/27 |
| 2022/0183050 A1* | 6/2022 | Marco | H04L 1/1822 |
| 2023/0171795 A1* | 6/2023 | Di Girolamo | H04W 72/51 370/329 |
| 2023/0189219 A1* | 6/2023 | Fu | H04W 72/115 370/329 |
| 2024/0196261 A1* | 6/2024 | Adjakple | H04W 28/0278 |

FOREIGN PATENT DOCUMENTS

| | | |
|---|---|---|
| CN | 111181693 A | 5/2020 |
| CN | 111294140 A | 6/2020 |
| EP | 4192149 A1 | 6/2023 |
| WO | WO2020114237 A1 | 6/2020 |
| WO | WO2022/027249 A1 | 2/2022 |

OTHER PUBLICATIONS

Ericsson, "Views on WID objective for IIOT/URLLC operation over shared spectrum", 3GPP Draft; RP-200826, Jun. 22, 2020 3rd Generation Partnership Project (3GPP), Mobile Competence Centre; 650, route des Lucioles ; F-06921 Sophia-Antipolis Cedex ; France, 6 pgs.

Guangdong Oppo Mobile Telecommunications Corp., Ltd., CN202311416703.8, Priority Review, Sep. 20, 2024, 9 pgs.

Guangdong Oppo Mobile Telecommunications Corp., Ltd., CN202311416703.8, First Office Action, Sep. 30, 2024, 7 pgs.

Guangdong Oppo Mobile Telecommunications Corp., Ltd., PCT/CN2020/106878, International Search Report and Written Opinion, Apr. 23, 2021, 14 pgs.

3GPP TR 38.889 V16.0.0 (Dec. 2018); Technical Specification Group Radio Access Network; Study on NR-based access to unlicensed spectrum (Release 16), 119 pgs.

Qualcomm Inc., "New WID on NR-based Access to Unlicensed Spectrum", 3GPP TSG RAN Meeting #82, RP-182878 (revision of RP-182806), Sorrento, Italy, Dec. 10-13, 2018; 3GPPTM Work Item Description Information on Work Items can be found at http://www.3gpp.org/Work-Items See also the 3GPP Working Procedures, article 39 and the TSG Working Methods in 3GPP TR 21.900, 8 pgs.

3GPP TS 38.321 V16.0.0 (Mar. 2020); "3rd Generation Partnership Project; Technical Specification Group Radio Access Network; NR; Medium Access Control (MAC) protocol specification (Release 16)", 140 pgs.

* cited by examiner

INFORMATION TRANSMISSION METHOD AND APPARATUS, AND DEVICE AND STORAGE MEDIUM

TECHNICAL FIELD

Embodiments of the present disclosure generally relate to the communication technical field, and more specifically, to an information transmission method and apparatus, a device and a storage medium.

BACKGROUND

Ultra-Reliable and Low Latency Communications (URLLC) is one of three application scenarios in the fifth generation (5th generation, 5G) communication. URLLC has new features such as high reliability, low latency, and extremely high availability. 5G URLLC is widely used in industrial control, factory automation, intelligent power grid, devices, Internet of Vehicle communications, remote surgery and other scenarios.

In 5G systems, configuration of multiple cell groups (CG) and specific configuration and use of each CG resource are introduced to support transmission of URLLC services. In order to support URLLC services in interference-controlled New Radio Unlicensed (NR-U) scenarios, both a CG resource configured based on NR-U and a CG resource configured based on ULRRC exist in the systems. Since the two CG resources are used in different ways, a method is urgently needed to coordinate the use of NR-U CG resource and ULRRC CG resource to ensure information transmission between a terminal device and a network device.

SUMMARY

Embodiments of the present disclosure provide an information transmission method and apparatus, a device and a storage medium, in order to coordinate the use of NR-U CG resource and ULRRC CG resource to ensure information transmission between a terminal device and a network device.

According to a first aspect, an embodiment of the present disclosure provides an information transmission method, including:
  receiving downlink information from a network device, wherein the downlink information includes at least one of: configuration information of at least one Configured Grant (CG) resource and indication information for an autonomous transmission mode;
  determining, according to the downlink information, an autonomous transmission mode for a target object, wherein the target object is any one of: a terminal device, a Media Access Control (MAC) entity, a cell group, a Hybrid Automatic Repeat Request (HARQ) process, and a CG resource; and
  performing an uplink transmission based on the autonomous transmission mode.

According to a second aspect, an embodiment of the present disclosure provides an information transmission method, including:
  generating downlink information according to at least one Configured Grant (CG) resource configured for a terminal device and/or a configured autonomous transmission mode, wherein the downlink information includes at least one of: configuration information of the at least one CG resource and indication information for the autonomous transmission mode; and
  sending the downlink information to the terminal device.

According to a third aspect, an embodiment of the present disclosure provides an information transmission apparatus, including:
  a receiving module configured to receive downlink information from a network device, wherein the downlink information includes at least one of: configuration information of at least one Configured Grant (CG) resource and indication information for an autonomous transmission mode;
  a processing module configured to determine, according to the downlink information, an autonomous transmission mode for a target object, wherein the target object is any one of: a terminal device, a Media Access Control (MAC) entity, a cell group, a Hybrid Automatic Repeat Request (HARQ) process, and a CG resource; and
  a sending module configured to perform an uplink transmission based on the autonomous transmission mode.

According to a fourth aspect, an embodiment of the present disclosure provides an information transmission apparatus, including:
  a processing module configured to generate downlink information according to at least one Configured Grant (CG) resource configured for a terminal device and/or a configured autonomous transmission mode, wherein the downlink information includes at least one of: configuration information of the at least one CG resource and indication information for the autonomous transmission mode; and
  a sending module configured to send the downlink information to the terminal device.

According to a fifth aspect, an embodiment of the present disclosure provides a terminal device, including: a processor, a memory, a transceiver and an interface for communicating with a network device;
  wherein the memory is configured to store computer executable instructions;
  wherein the processor is configured to execute the computer executable instructions stored in the memory to cause the processor to perform the method according to the first aspect.

Optionally, the processor may be a chip.

According to a sixth aspect, an embodiment of the present disclosure provides a network device, including: a processor, a memory, a transceiver and an interface for communicating with a terminal device;
  wherein the memory is configured to store computer executable instructions;
  wherein the processor is configured to execute the computer executable instructions stored in the memory to cause the processor to perform the method according to the second aspect.

Optionally, the processor may be a chip.

According to a seventh aspect, an embodiment of the present disclosure provides a computer-readable storage medium having computer executable instructions stored thereon, wherein when the computer executable instructions are executed by a processor, the processor is caused to perform the method according to the first aspect.

According to an eighth aspect, an embodiment of the present disclosure provides a computer-readable storage medium having computer executable instructions stored thereon, wherein when the computer executable instructions are executed by a processor, the processor is caused to perform the method according to the second aspect.

According to a ninth aspect, an embodiment of the present disclosure provides a program. When the program is executed by a processor, the processor is caused to perform the method according to the first aspect.

According to a tenth aspect, an embodiment of the present disclosure provides a program. When the program is executed by a processor, the processor is caused to perform the method according to the second aspect.

According to an eleventh aspect, an embodiment of the present disclosure provides a computer program product including program instructions for implementing the method according to the first aspect.

According to a twelfth aspect, an embodiment of the present disclosure provides a computer program product including program instructions for implementing the method according to the second aspect.

According to a thirteenth aspect, an embodiment of the present disclosure provides a chip including a processing module and a communication interface. The processing module is configured to perform the method according to the first aspect.

Also, the chip further includes a storage module (e.g., a memory) for storing instructions. The processing module is configured to execute the instructions stored in the storage module, and execution of the instructions stored in the storage module causes the processing module to perform the method according to the first aspect.

According to a fourteenth aspect, an embodiment of the present disclosure provides a chip including a processing module and a communication interface. The processing module is configured to perform the method according to the second aspect.

Also, the chip further includes a storage module (e.g., a memory) for storing instructions. The processing module is configured to execute the instructions stored in the storage module, and execution of the instructions stored in the storage module causes the processing module to perform the method according to the second aspect.

According to a fifteenth aspect, an embodiment of the present disclosure provides a communication system, including a network device and a terminal device;
  wherein the terminal device is the apparatus according to the third aspect and the network device is the apparatus according to the fourth aspect.

In the information transmission methods and apparatuses, devices and storage medium, after the terminal device receives the downlink information from the network device, the terminal device can determine the autonomous transmission mode for at least one of the terminal device, a HARQ process and a CG resource according to the configured at least one CG resource and/or the indicated autonomous transmission mode, and perform the uplink transmission based on the autonomous transmission mode. In the technical solutions, when the terminal device is configured with two kinds of CG resources, the terminal device can determine the autonomous transmission mode to be used, thereby ensuring information between the terminal device and the network device.

DETAILED DESCRIPTION

Figure 1:
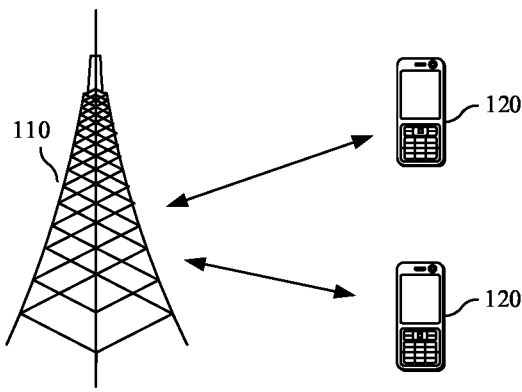
FIG. 1 is a schematic diagram of a structure of a communication system according to an embodiment of the present disclosure.

In order to make the purpose, technical solutions and advantages of embodiments of present disclosure clearer, the technical solutions in the embodiments of present disclosure will be described clearly and completely below in conjunction with the accompanying drawings in the embodiments of present disclosure. It is clear that the embodiments described herein are a part of the embodiments of present disclosure and not all of them. Based on the embodiments described herein, all other embodiments obtained by a person of ordinary skill in the art without making creative labor should fall within the scope of protection of present disclosure.

The terms "first", "second", etc. in the specification, claims and the above-mentioned drawings of the embodiments of present disclosure are used to distinguish similar objects and are not necessarily used to describe a particular order or sequence. It should be understood that the data so used is interchangeable where appropriate, so that the embodiments of the present disclosure described herein may be implemented in an order other than that illustrated or described herein. In addition, the terms "including(include)" and "having(have)" and any variations thereof are intended to cover non-exclusive inclusion, e.g., a process, method, system, product, or apparatus including a series of steps or units is not necessarily limited to those steps or units that are clearly listed, but may include those that are not clearly listed or may include other steps or units that are inherent to the process, method, product, or apparatus.

The following explains terms involved in embodiments of the present disclosure.
URLLC Related Background In the URLLC for 5G Access Network 2 (5G RAN2 URLLC), it is specified that services such as Factory automation, Transport Industry, and Electrical Power Distribution need to be supported in the transmission services of the 5G system. In practical applications, a terminal device usually performs service transmission according to a configured grant (CG) resource. According to the figure, the CG resource is configured by the network-side device to the terminal device, and after the configured grant is activated, the terminal device may perform communications according to the CG resource.

In 5G RAN2 URLLC, CG resource enhancements are provided to support the transmission of URLLC services, i.e., multiple CG resource configurations are introduced, and the specific configuration and use of CG resources (e.g., support for slot-level period, support for autonomous transmission for CG resources, etc.) are enhanced.

With the development of services, Rel-17 needs to consider supporting URLLC services in interference-controlled NR-U scenarios. Specifically, the use of NR-U CG resources and ULRRC CG resource enhancements in NR-U scenarios may be considered, i.e., by harmonizing UL configured-grant enhancements in NR-U and URLLC introduced in Rel-16 to be applicable for unlicensed spectrum.

CG Resource Enhancements in URLLC

In order to support the high latency requirements of URLLC services, the CG resource period is enhanced in URLLC to support any slot-level service period.

Specifically, in order to support multiple URLLC services and the high latency requirements of URLLC services, URLLC introduces multiple CG (multi CG) resources. Different CG resources are configured with different Hybrid Automatic Repeat Request (HARQ) processes, and a HARQ process identity offset (harq-ProcID-Offset2) is used to guarantee that processes for different CG resources are different.

In practical applications, due to the existence of conflicts between CG resources and other resources, autonomous transmission for CG resources is introduced in order to ensure that packetized MAC PDUs (i.e., deprioritized MAC PDUs) in the CG resources are not discarded and/or transmitted as soon as possible. For CG resources for which MAC PDUs are already packetized and cannot be transmitted due to a resource conflict, a new transmission may be performed using a subsequent CG resource that is with a same HARQ process and belongs to same CG configuration information. Exemplarily, the use of autonomous transmission is determined by the autonomous transmission identifier (autonomousTx).

NR-U Related Background

In one of 3GPP projects, the NR-unlicensed working mode is specified with the goal of making NR work in the unlicensed band. Specifically, the NR-U system may include the following working scenarios.

Scenario A: in a carrier aggregation working scenario, a primary serving cell (Primary Cell, Pcell) works on the licensed spectrum, and a secondary serving cell (Secondary Cell, Scell) aggregately works on the unlicensed spectrum by carrier aggregation.

In this scenario, a UE may communicate with a base station through multiple component carriers simultaneously after entering a connected state. The base station assigns a Primary Component Carrier (PCC) to the UE through explicit configuration or according to a protocol, and the other component carriers are called Secondary Component Carriers (SCCs). The serving cell on the PCC is called the primary serving cell (Pcell), and a serving cell on the SCC is called the secondary serving cell (Scell).

Scenario B: in a LTE and NR dual connection working scenario, that is, when a terminal device works in the LTE and NR dual connection scenario, the primary serving cell (PCell) of the terminal device may be LTE licensed spectrum, and the secondary serving cell (PScell) of the terminal device may be NR un licensed spectrum. The dual connection technology may realize the cooperative work between LTE and NR systems, which helps to improve the user rate and reduce the switching delay.

Scenario C: in a standalone working scenario, the NR system works as an independent cell in the unlicensed spectrum.

Scenario D: in a NR single-cell scenario, the uplink (UL) transmission of terminal device works in the licensed spectrum and the downlink (DL) transmission works in the unlicensed spectrum.

Scenario E: in a LTE and NR dual connection operation scenario, the primary serving cell (PCell) of terminal device may be NR licensed spectrum, and the secondary serving cell (PScell) is NR unlicensed spectrum.

In general, the working band of NR-U is 5 GHz unlicensed spectrum and 6 GHz unlicensed spectrum. In the unlicensed spectrum, NR-U should be designed to ensure fairness with other systems already working on these unlicensed spectrums, such as WiFi, etc. The principle of fairness is that NR-U cannot have more influence on systems already deployed on the unlicensed spectrums (such as WiFi) than an influence between these systems.

To ensure fair coexistence among systems on the unlicensed spectrum, energy detection has been agreed as a basic coexistence mechanism. The general energy detection mechanism is the Listen Before Talk (LBT) mechanism. The basic principle of the mechanism is that: before transmitting data on the unlicensed spectrum, a transmitting device (a base station or a terminal) needs to listen to a channel for a period of time as required, i.e., monitoring the channel to see if other communication devices are sending data on the channel. If the listening result indicates that the channel is idle, the transmitting device can transmit data to a receiving device. If the listening result indicates that the channel is occupied, the transmitting device needs to back off for a period of time as required and continue listening to the channel until the channel listening result is idle, then the transmitting device can transmit data to the receiving device.

Normally, in order to ensure fairness, the duration of signal transmission by a communication device using a channel of an unlicensed spectrum in one transmission cannot exceed the Maximum Channel Occupancy Time (MCOT).

The following is a brief description of four channel access schemes specified in NR-U.

Scheme 1: Immediate Transmission Scheme

Specifically, the immediate transmission scheme is that a transmitting end may quickly transmit after a switching gap inside a Channel Occupancy Time (COT). The switching gap is the trunaround time from reception to transmission. Usually, the trunaround time is short enough, and the typical value is no more than 16 us.

Scheme 2: LBT Scheme without Random Back-Off

Optionally, this scheme means that the duration of time that the channel is sensed by the transmitting end is deterministic and is typically relatively short, e.g., 25 us.

Scheme 3: LBT Scheme with Random Back-Off (with a Contention Window of Fixed Size)

In the LBT procedure, the transmitting end randomly takes a random value in the contention window to determine the time to listen to the channel.

Scheme 4: LBT Scheme with Random Back-Off (with a Contention Window of Variable Size)

In the LBT procedure, the transmitting end randomly takes a random value in the contention window to decide the time to listen to the channel, and the contention window is variable.

In summary, for the terminal device, the network device (base station) needs to transmit data to the terminal device within the MCOT time. If the network device does not preempt a channel, that is, outside the MCOT time, the terminal device cannot receive the scheduling data sent by the network device to the terminal device.

Optionally, a CG retransmission timer (cg-Retransmission Timer) is introduced in NR-U in order to support autonomous resource retransmission when CG resources transmission cannot be performed due to LBT failure. After the cg-Retransmission Timer expires, if the configured Grant Timer does not expire, retransmission may be performed for a HARQ process corresponding to a CG resource, transmission for which has not been performed.

In practical applications, CG resource transmission may be interrupted by dynamically scheduled Downlink Control Information (DCI) and Downlink Feedback Information (DFI). As an example, Table 1 shows the behavior of CG timer and CG retx timer when CG resource transmission is interrupted by dynamically scheduled DCI and DFI:

TABLE 1

|  | DFI = ACK | DFI = NACK | DCI = new transmission (new tx) | DCI = retransmission (retx) | CG timer expires |
|---|---|---|---|---|---|
| CG timer | stop | No impact | Start or Restart | Start or Restart | None |
| CG retransmission timer | stop | stop | stop | stop | stop |

Uplink LBT Failure in NR-U

The uplink transmission initiated by a terminal device includes mainly the following categories.

1. Uplink scheduling request (SR): used to request an uplink resource. That is, if the terminal device does not have uplink data to transmit, the base station does not need to allocate an uplink resource for the terminal device; otherwise, it will cause a waste of resources.
2. Physical Random Access Channel (PRACH) transmission: this is triggered by RACH, and the terminal device needs to send message 1 (msg1).
3. Physical Uplink Shared Channel (PUSCH) transmission: including uplink data transmission based on configured grant and uplink data transmission based on dynamic grant.
4. Physical layer signaling transmission: including acknowledgement and/or negative acknowledgement (ACK/NACK) information feedback, Channel State Information (CSI) report, etc.

In the unlicensed band, the terminal device needs to listen to a channel with LBT to see if the channel is available before the terminal device performs uplink transmission based on SR, PRACH or PUSCH, etc. If the channel is not available, i.e., LBT fails, the terminal device needs to wait until a next transmission opportunity to perform LBT again. If LBT failure is detected, the MAC layer needs to be notified of the LBT failure information.

CG Resource Enhancements in NR-U

To improve the flexibility of resource selection, the HARQ processes for NR-U CG resources are not calculated according to a formula, but is selected by the terminal device itself. For one CG resource, the Radio Resource Control (RRC) configures a HARQ process set, and the terminal device may select one HARQ process in this HARQ process set for this CG resource transmission. Specifically, the configured HARQ process set includes a HARQ process interval determined by the HARQ process identity offset (harq-ProcID-Offset) and the HARQ processes in NR (nr of HARQ-Processes).

Optionally, in order to support back-to-back resource configuration, multiple CG (multiple CG) resources are introduced in NR-U, where multiple CG resources may share a HARQ process.

With the above analysis, it can be seen that when URLLC service is supported in interference-controlled NR-U scenario, the network may configure both ULRRC CG resources and NR-U CG resources for a terminal device simultaneously, but the two CG resources are used in different ways, and thus a method is urgently needed to harmonize the use of NR-U CG resources and ULRRC CG resources to ensure the information transmission between the terminal device and a network device.

It is worth stating that, in embodiments of the present disclosure, a URLLC CG resource is: a CG configuration that supports a high reliability and low latency service; or, a CG configuration when a uplink service is supported on the licensed bandwidth or NR system; or, a CG configuration that supports a high reliability and low latency service on the licensed bandwidth or NR system; or, a CG configuration that does not include a specific configuration parameter. Optionally, the URLLC CG resource corresponds to the configuration or configuration manner or usage mechanism of the Rel-16 NR.

Optionally, a NR-U CG resource is: a CG configuration when a uplink service is supported on the unlicensed spectrum or NR-U system; or, a CG configuration that includes a second specific configuration parameter. Optionally, the NR-U CG corresponds to the configuration or configuration manner or usage mechanism of the Rel-16 NR-U.

In view of the above problem, an embodiment of the present disclosure provides an information transmission method. In the method, after the terminal device receives the downlink information from the network device, the terminal device can determine the autonomous transmission mode for at least one of the terminal device, a HARQ process and a CG resource according to configured at least one CG resource and/or an indicated autonomous transmission mode, and perform the uplink transmission based on the autonomous transmission mode. In the technical solution, when the terminal device is configured with two kinds of CG resources, the terminal device can determine the autonomous transmission mode to be used, thereby ensuring information between the terminal device and the network device.

Specifically, for a same terminal device, in a case where the NR-U CG resource and the URLLC CG resource are configured simultaneously, or, in a case where the CG resource is configured according to both the URLLC CG manner and the NR-U CG manner simultaneously, the terminal device performs one of the following behaviors:

restricting a same HARQ process and/or CG resource from supporting multiple autonomous transmission modes;

allowing a same HARQ process and/or CG resource to support multiple autonomous transmission modes simultaneously, in which case the terminal device performs one of the following behaviors: always performing autonomous transmission in accordance with one of the modes; performing autonomous transmission in accordance with a combination of the modes.

Optionally, the above-mentioned autonomous transmission modes are: URLLC CG autonomous transmission mode corresponding to the URLLC CG resource (i.e., autonomous TX is configured), and NR-U CG autonomous retransmission mode corresponding to the NR-U CG resource (i.e., CG-retx timer is configured).

Before presenting the technical solutions of present disclosure, the communication systems to which present disclosure applies are first described below.

Exemplarily, FIG. 1 shows a schematic diagram of a structure of a communication system according to an embodiment of the present disclosure. As shown in FIG. 1, the communication system may include a network device 110 and a plurality of terminal devices 120 located within the coverage area of the network device 110. Exemplarily, FIG. 1 illustrates one network device 110 and two terminal devices 120.

Optionally, the communication system may include a plurality of network devices 110, and each network device may include other numbers of terminal devices 120 within the coverage area of each network device, and embodiments of the present disclosure do not limit the number of network devices 110 and terminal devices 120 included in the communication system.

As shown in FIG. 1, wireless communication may be conducted between the terminal devices 120 and the network device 110. The terminal devices 120 may communicate with each other by device to device (D2D) communication. Optionally, communications between the network device 110 and the terminal devices 120 and communications between the terminal devices may be via the licensed spectrum, or via the unlicensed spectrum, or via both the licensed spectrum and the unlicensed spectrum. The embodiments of the present disclosure do not limit the way of communications between the network device and the terminal devices and communications between the terminal devices.

It is understood that FIG. 1 is only a schematic diagram, and the communication system may also include other network devices, for example, a core network device, a wireless relay device and a wireless backhaul device, or may include other network entities such as a network controller, a mobile management entity, etc. Embodiments of the present disclosure are not limited thereto.

The technical solutions according to embodiments of the present disclosure may be applied in various communication systems, such as: Global System of Mobile communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolutionary system of NR system, LTE-based access to unlicensed spectrum (LTE-U) system, NR-based access to unlicened spectrum (NR-U) system, Universal Mobile Telecommunication System (UMTS), Worldwide interoperability for Microwave Access (WiMAX) communication system, Wireless Local Area Network (WLAN), Wireless Fidelity (WiFi), next generation communication system, or other communication systems.

Generally speaking, traditional communication systems support a limited number of connections and are easy to implement. However, with the development of communication technologies, mobile communication systems will not only support traditional communications, but also support, for example, Device-to-Device (D2D) communication, Machine-to-Machine (M2M) communication, Machine-Type Communication (MTC), and Vehicle-to-Vehicle (V2V) communication, etc. Embodiments of the present disclosure may also be applied to these communication systems.

The system architectures and service scenarios described in embodiments of the present disclosure are intended to illustrate the technical solutions of embodiments of the present disclosure more clearly, and do not constitute a limitation of the technical solutions provided by embodiments of the present disclosure. It is known to a person of ordinary skill in the art that the technical solutions provided by embodiments of the present disclosure are equally applicable to similar technical problems as the network architecture evolves and new service scenarios emerge.

The network device involved in embodiments of the present disclosure may be an ordinary base station (such as NodeB or eNB or gNB), a new radio controller (NR controller), a centralized unit, a new radio base station, a radio remote module, a micro base station, a relay, a distributed unit, a transmission reception point (TRP), a transmission point (TP), or any other device. The embodiments of present disclosure do not limit the specific technology and specific device form used in the network device. For the convenience of description, in all embodiments of the present disclosure, the above devices providing wireless communication functions for terminal devices are collectively referred to as network devices.

In embodiments of the present disclosure, a terminal device may be any terminal. For example, the terminal device may be a user device for machine-type communication. That is, the terminal device may also be called a user equipment (UE), a mobile station (MS), a mobile terminal, a terminal, etc. The terminal device may communicate with one or more core networks via a Radio Access Network (RAN). For example, the terminal device may be a mobile phone (or called "cellular" phone), a computer with a mobile terminal, etc. For example, the terminal device may also be a portable, pocket-sized, handheld, computer-integrated or vehicle-mounted mobile device that exchanges language and/or data with the radio access network. No specific limitations are made in embodiments of the present disclosure.

Optionally, the network devices and terminal devices may be deployed on land, including indoor or outdoor, handheld or vehicle-mounted; or the network devices and terminal devices may be deployed on water; or, the network devices and terminal devices may be deployed on aircraft, balloons, and artificial satellites in the air. The embodiments of present disclosure do not limit the application scenarios of the network devices and terminal devices.

In the following, the technical solutions of the present disclosure will be described in detail by example embodiments based on the communication system shown in FIG. 1. It should be noted that the technical solutions of the present disclosure may include some or all of the following contents, and these example embodiments below may be combined with each other, and the same or similar concepts or processes may not be repeated in some embodiments.

Figure 2:
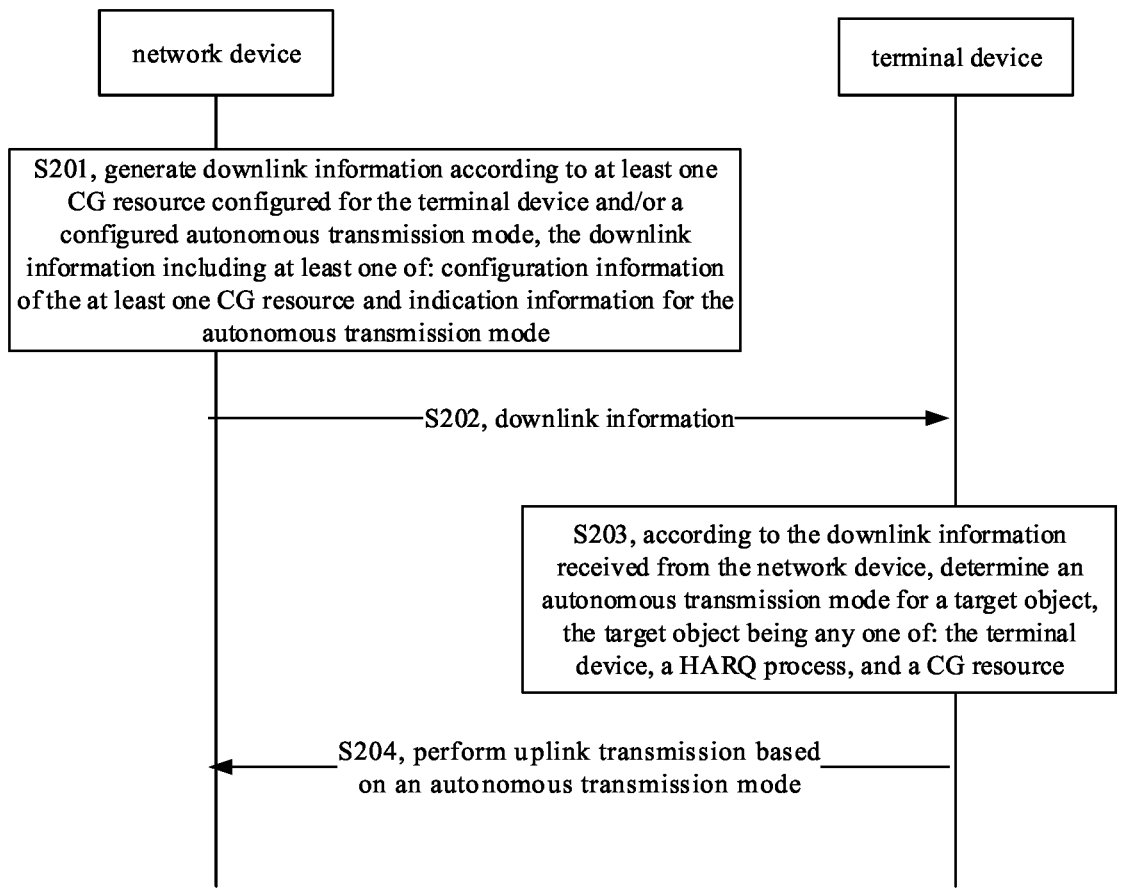
FIG. 2 is a schematic diagram showing interactions in an information transmission method according to a first embodiment of the present disclosure.

FIG. 2 is a schematic diagram showing interactions in an information transmission method according to a first embodiment of the present disclosure. The method is explained and illustrated in terms of the information interactions between a terminal device and a network device. It can be understood that the network device may communicate with multiple terminal devices at the same time, and this embodiment is illustrated with one terminal device interacting with the network device, and the implementation scheme with respect to other terminal devices are similar, which will not be described in this embodiment.

In the embodiment of the present disclosure, as shown in FIG. 2, the information transmission method may include the following steps:

In S201, the network device generates downlink information according to at least one CG resource configured for the terminal device and/or a configured autonomous transmission mode. The downlink information includes at least one of: configuration information of the at least one CG resource and indication information for the autonomous transmission mode.

In the interference-controlled NR-U scenario, in order to be able to support URLLC services while ensuring communications between the network device and the terminal device, the network device sends certain configuration information to the terminal device, for example, transmission resources that can be used, or an information transmission mode, and so on.

As an example, when the network device configures at least one CG resource that is usable by the terminal device, the network device may also configure an autonomous transmission mode that is usable by the terminal device at the same time in an implicit or explicit manner and send it to the terminal device at the same time. In this case, the downlink information generated by the network device includes the configuration information of the at least one CG resource. Optionally, the configuration information of the at least one CG resource carries a configuration parameter for transmission. Optionally, the autonomous transmission mode is determined based on the configuration parameter.

As another example, the network device may configure for the terminal device the at least one CG resource that is usable by the terminal device and the autonomous transmission mode that is usable by the terminal device, respectively, and send them to the terminal device, respectively. In this case, the downlink information generated by the network device includes the indication information for the autonomous transmission mode. Optionally, the network device may send the configuration information of the at least one CG resource before sending the indication information.

Optionally, when the network device configures at least one CG resource for the terminal device, the network device may also configure the autonomous transmission mode for the terminal device accordingly.

As an example, when a first CG resource and a second CG resource are configured for the terminal device, the network device may configure only a first autonomous transmission mode or only a second autonomous retransmission mode for the terminal device.

As another example, when the first CG resource and the second CG resource are configured for the terminal device, the network device may configure only the first autonomous transmission mode or the second autonomous retransmission mode for each CG resource or each HARQ process or MAC entity or cell group or HARQ process group or CG resource group.

As a further example, when only the first CG resource or the second CG resource is configured for the terminal device, the network device may configure only one autonomous transmission mode for one of the terminal device, each HARQ process, MAC entity or cell group, HARQ process group, CG resource group, and each CG resource.

As yet another example, when the first CG resource and the second CG resource are configured for the terminal device, the network device may configure multiple autonomous transmission modes for the terminal device simultaneously. For example, when the first CG resource and the second CG resource are configured for the terminal device, the first autonomous transmission mode and the second autonomous retransmission mode are configured, respectively.

As yet another example, when the first CG resource or the second CG resource is configured for the terminal device, the network device may configure multiple autonomous transmission modes for the terminal device simultaneously, but one of the autonomous transmission modes (e.g., the one of the autonomous transmission modes is determined by UE or is indicated by network) is ultimately used.

In S202, the network device sends downlink information to the terminal device.

Optionally, in order to ensure uplink communication transmission between the terminal device and the network device, the network device may send the at least one CG resource configured for the terminal device and/or the configured autonomous transmission mode to the terminal device via the downlink information, and accordingly, the terminal device may receive the downlink information from the network device.

In S203, according to the above downlink information received from the network device, the terminal device determines an autonomous transmission mode for a target object. The target object is any one of: the terminal device, a MAC entity, a cell group, a HARQ process, and a CG resource.

As an example, when the downlink information includes configuration information of at least one CG resource, i.e., the configuration information includes at least a specific CG configuration parameter, such as a CG retransmission timer (CG retx timer), which may be used to indicate a transmission configuration parameter for the autonomous transmission mode. In this case, the terminal device is able to determine the autonomous transmission mode for at least one of the terminal device, the MAC entity, the cell group, the HARQ process and the CG resource, according to the configured at least one CG resource and/or the specific CG configuration parameter in the configuration information.

As another example, when the downlink information includes the indication information for the autonomous transmission mode, or when the downlink information includes the configuration information of the at least one CG resource and the indication information for the autonomous transmission mode, i.e., when the network device configures the at least one CG resource that is usable by the terminal device and also indicates the autonomous transmission mode configured for the terminal device explicitly through the indication information, the terminal device is able to determine the autonomous transmission mode for at least one of the terminal device, the MAC entity, the cell group, the HARQ process and the CG resource according to the configured at least one CG resource and the indication information.

It is understood that the target object in embodiments of the present disclosure is at least one of the terminal device, the MAC entity, the cell group, the HARQ process, and the CG resource as an example. In practical applications, the target object may also be at least one of a HARQ process group and a CG group. Embodiments of the present disclosure do not limit the specific form of the target object, which can be determined according to the actual scenarios and details will be omitted here.

Optionally, upon receiving the downlink information, the terminal device firstly determines the configured at least one CG resource and/or configured transmission configuration parameter according to the above configuration information. Secondly, the terminal device determines the autonomous transmission mode of the target object according to the configured at least one CG resource and/or configured transmission configuration parameter, and/or, the terminal device determines the autonomous transmission mode for the target object according to the configuration information and the indication information included in the downlink information.

It is understood that in the embodiments of the present disclosure, the autonomous transmission modes may include: a first autonomous transmission mode and a second autonomous retransmission mode. The first autonomous transmission mode is the URLLC CG autonomous transmission mode (i.e., the parameter autonomousTX is configured). The second autonomous retransmission mode is the NR-U CG autonomous retransmission mode (i.e., the parameter CG-retx timer is configured). Optionally, the autonomous transmission mode of the target object may be a legacy mode or an enhanced mode, and details are omitted here.

Exemplarily, the autonomous transmission mode for the target object expected by the terminal device includes at least one of the following:
  expecting, by the terminal device, that a same HARQ process and/or CG resource is configured with only one autonomous transmission mode;
  expecting, by the terminal device, that a same HARQ process group and/or CG resource group is configured with only one autonomous transmission mode;
  expecting, by the terminal device, a same MAC entity or cell group is configured with only one autonomous transmission mode; and
  expecting, by the terminal device, that only one autonomous transmission mode is configured.

Specifically, the terminal device may expect that at least one of the same HARQ process, CG resource, same HARQ process group, CG resource group, the terminal device, MAC entity, and cell group is configured with only the first autonomous transmission mode or the second autonomous retransmission mode.

Exemplarily, the autonomous transmission mode for the target object includes any of the following:
  a same HARQ process and/or CG resource being configured with only one autonomous transmission mode;
  a same HARQ process group and/or CG resource group being configured with only one autonomous transmission mode;
  a same MAC entity or cell group of the terminal device being configured with only one autonomous transmission mode; and
  a same terminal device being configured with only one autonomous transmission mode.

Specifically, when the at least one CG resource configured by the configuration information meets a first condition, the terminal device determines, according to the received downlink information, that the network device configures only the first autonomous transmission mode or the second autonomous retransmission mode for at least one of the same HARQ process, CG resource, same HARQ process group, CG resource group, the terminal device, MAC entity, and cell group.

In each of the above examples, the configuration information of the at least one CG resource or the autonomous transmission mode for the target object meets at least one of the following:
  for a same terminal device or MAC entity or CG resource, a first CG resource and a second CG resource are configured simultaneously, i.e., the network device configures a NR-U CG resource and a URLLC CG resource simultaneously for a same terminal device or CG resource;
  for a same terminal device or MAC entity or CG resource, the at least one CG resource includes the first CG resource configured in a first mode and the second CG resource configured in a second mode simultaneously, i.e., the network device configures the CG resources or configures the CG resources for the terminal device in accordance with both the URLLC CG mode and the NR-U CG mode simultaneously;
  for a same terminal device or MAC entity or CG resource, at least one CG resource transmission is performed in accordance with a first mode and a second mode, i.e., the network device performs the at least one CG resource transmission in accordance with both the URLLC CG mode and the NR-U CG mode for a same terminal device or CG resource;
  for a same terminal device or MAC entity or CG resource, the at least one CG resource transmission is performed in accordance with the first mode or the second mode, i.e., the network device performs at least one CG resource transmission in accordance with the URLLC CG autonomous transmission mode or performs the at least one CG resource transmission in accordance with the NR-U CG autonomous retransmission mode for a same terminal device or CG resource;
  for a same terminal device or MAC entity or CG resource, only the first CG resource or the second CG resource is configured, i.e., the network device configures only the URLLC CG resource or only configures the NR-U CG resource for a same terminal device or CG resource;
  for a same terminal device or MAC entity or CG resource, the at least one CG resource includes the first CG resource configured in the first mode or the second CG resource configured in the second mode, i.e., the at least one CG resource configured by the network device or the at least one CG resource configured for a same terminal device includes the URLLC CG resource configured in accordance with the URLLC CG mode or the NR-U CG resource configured in accordance with the NR-U CG mode.

Optionally, in an embodiment of the present disclosure, before performing step S203, the terminal device may further perform the step of:
  configuring at least one corresponding CG resource for the terminal device according to the configuration information; and determining whether the target object supports and/or is configured with an autonomous transmission.

Exemplarily, based on the received configuration information, the terminal device can determine the at least one CG resource configured by the network device. For example, both the first CG resource and the second CG resource are configured; or, the first CG resource is configured in a first mode and the second CG resource is configured in a second mode simultaneously; or, only the first CG resource is configured or only the second CG resource is configured; or, only the first CG resource is configured in a first mode, or, only the second CG resource is configured in a second mode. Embodiments of the present disclosure do not limit the specific resources configured for the terminal device, which may be determined based on the configuration information of the network device and are not described herein.

In embodiments of present disclosure, description will be made using an example where the first CG resource is the URLLC CG resource, the second CG resource is the NR-U CG resource, the first mode is the URLLC CG mode, and the second mode is NR-U CG mode; other names may be used, and embodiments of the present disclosure do not impose specific limitations on this.

In addition, the terminal device may determine whether at least one of the terminal device, the HARQ process, the CG resource, and the MAC entity supports and/or is configured with autonomous transmission based on the received configuration information or/and the above indication information. For example, the terminal device may determine whether the target object is configured with and/or supports autonomous transmission, and/or, how to perform autonomous transmission, based on whether the configuration information carries a transmission configuration parameter and/or whether the indication information is received.

Exemplarily, when the transmission configuration parameter is not carried in the configuration information and the indication information is not received, it is determined that the target object does not support the autonomous transmission mode; when the transmission configuration parameter is carried in the configuration information and/or the indication information is received, it is determined that the target object is configured with and/or supports the autonomous transmission mode, and/or, the used autonomous transmission mode may be determined.

In S204, the terminal device performs uplink transmission based on the autonomous transmission mode.

Optionally, in embodiments of the present disclosure, after the terminal device determines the autonomous transmission mode for the target object according to the received downlink information, the terminal device may perform an uplink transmission based on the autonomous transmission mode for the target object.

In practical applications, when the terminal device determines that the target object supports and/or is configured with autonomous transmission, the terminal device may perform autonomous transmission and/or autonomous retransmission based on the determined autonomous transmission mode on the at least one CG resource corresponding to the target object.

Specifically, step S204 may be implemented by different steps depending on the target object as follows.

As an example, in a case where the target object is a terminal device, the uplink transmission is performed using the autonomous transmission mode configured for the terminal device and/or supported by the terminal device.

As another example, when the target object is at least one CG resource group or at least one CG resource or at least one HARQ process or at least one HARQ process group or at least one cell group, for different CG resource groups or CG resources or HARQ processes or MAC entities or cell groups, the autonomous transmission mode corresponding to each object is used for the uplink transmission.

In the information transmission method provided in embodiments of the present disclosure, the network device generates downlink information according to the at least one CG resource configured for the terminal device and/or the configured autonomous transmission mode, and sends the downlink information to the terminal device. The downlink information includes at least one of the following: configuration information of the at least one CG resource and indication information for the autonomous transmission mode. The terminal device determines the autonomous transmission mode for the target object according to the received downlink information, and performs uplink transmission based on the autonomous transmission mode. The target object is any one of the following: the terminal device, a HARQ process, and a CG resource. In this technical solution, when the terminal device is configured with at least one kind of CG resource, the terminal device is able to determine the autonomous transmission mode that can be used, and information transmission between the terminal device and the network device is ensured.

Figure 3:
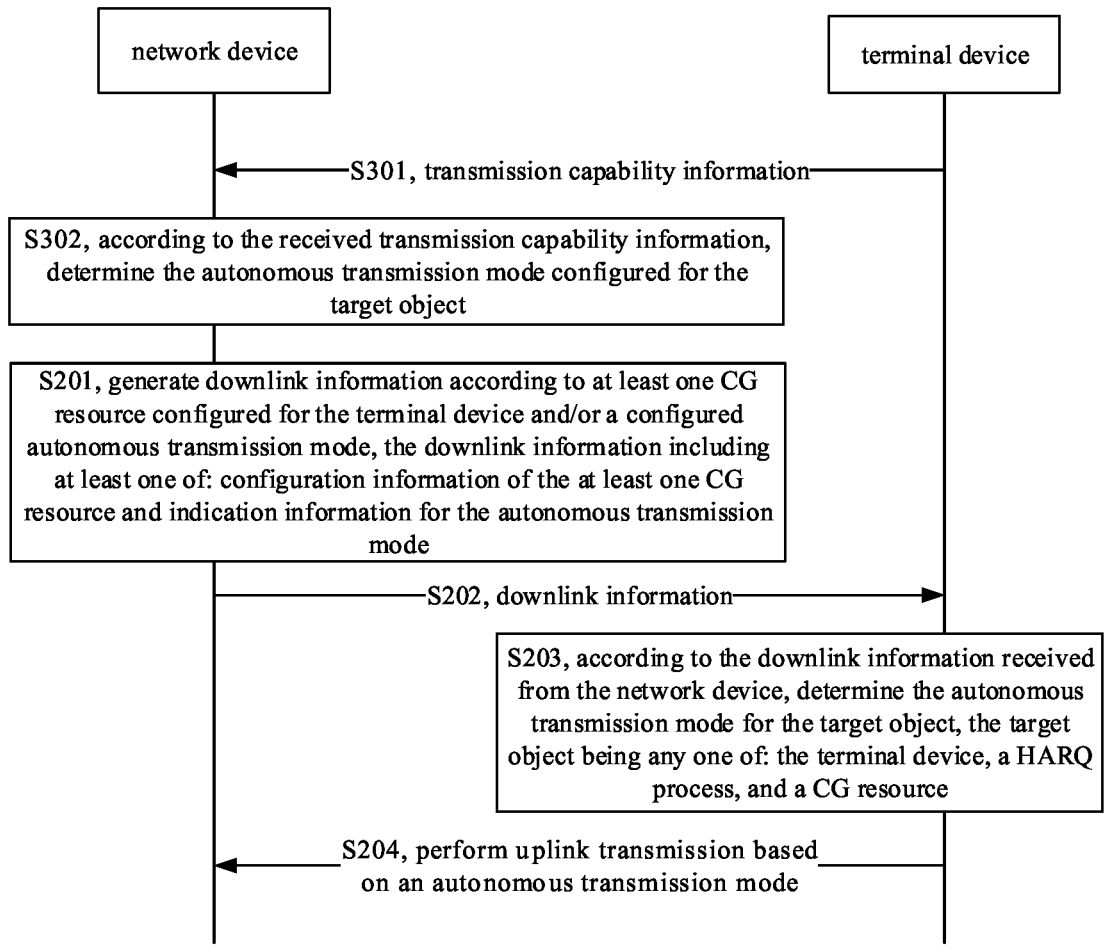
FIG. 3 is a schematic diagram showing interactions in an information transmission method according to a second embodiment of the present disclosure.

On the basis of the above embodiments, FIG. 3 is a schematic diagram showing interactions in an information transmission method according to a second embodiment of the present disclosure. As shown in FIG. 3, the method may further include the following steps prior to S201.

In S301, the terminal device sends transmission capability information to the network device.

The transmission capability information includes at least one of the following: whether multiple autonomous transmission capabilities are supported simultaneously, and at least one supported autonomous transmission capability.

Specifically, the terminal device may determine the transmission capability it has based on its own performance, and the terminal device may send transmission capability to the network device, so that the network device can configure an autonomous transmission mode expected by the terminal device.

In one possible design of the present disclosure, the transmission capability information is specifically that the terminal device supports multiple autonomous transmission capabilities simultaneously, and/or, multiple autonomous transmission capabilities that are supported. In another possible design of the present disclosure, the transmission capability information is specifically that the terminal device does not support multiple autonomous transmission capabilities simultaneously, and/or, one autonomous transmission capability that is supported.

Exemplarily, the at least one autonomous transmission capability supported by the terminal device includes at least one of:

supporting only a first autonomous transmission mode, such as the URLLC CG autonomous transmission mode (for example, the parameter autonomousTX is configured);

supporting only a second autonomous transmission mode, such as the NR-U CG autonomous retransmission mode (for example, the parameter CG-retx timer is configured); and supporting both the first autonomous transmission mode and the second autonomous transmission mode simultaneously, such as supporting both the URLLC CG autonomous transmission mode (i.e., the parameter autonomousTX is configured) and the NR-U CG autonomous retransmission mode (i.e., the parameter CG-retx timer is configured) simultaneously.

It is understood that in the embodiments of the present disclosure, the transmission capability information reported by the terminal device is for any one of the following granularities:

per data resource block, per terminal device, per MAC entity, per cell group, per CG resource, and per HARQ process.

Specifically, the transmission capability information uploaded by the terminal device may be transmission capability information for each data resource block, or the transmission capability information for the terminal device, or transmission capability information for each CG resource, or transmission capability information for each HARQ process. Further, the transmission capability information may be information per MAC entity, per cell group, per HARQ process group, per CG group, and information for other granularities. The embodiments of the present disclosure do not limit the granularity of the transmission capability information, which may be determined according to the scenario where the terminal device is, and details are omitted here.

In S302, according to the received transmission capability information, the network device determines the autonomous transmission mode configured for the target object.

In the embodiments of the present disclosure, when the network device receives the transmission capability information of the terminal device, the network device may configure the autonomous transmission mode for the target object according to the autonomous transmission capability supported by the terminal device.

Exemplarily, when the terminal device supports two autonomous transmission capabilities, two autonomous transmission modes may be configured for the target object, or only one autonomous transmission mode may be configured for the target object. When the terminal device supports only one autonomous transmission capability, only one autonomous transmission mode may be configured for the target object.

The specific autonomous transmission mode(s) configured for the target object by the network device may be set according to the actual needs, and details will be omitted here.

In the information transmission mode provided by the embodiments of the present disclosure, the terminal device sends transmission capability information to the network device, so that the network device can configure an autonomous transmission mode for the target object according to the received transmission capability information, which improves the matching of the configured autonomous transmission mode with the transmission capability information of the terminal device and thus improves the transmission performance between the network device and the terminal device.

Figure 4:
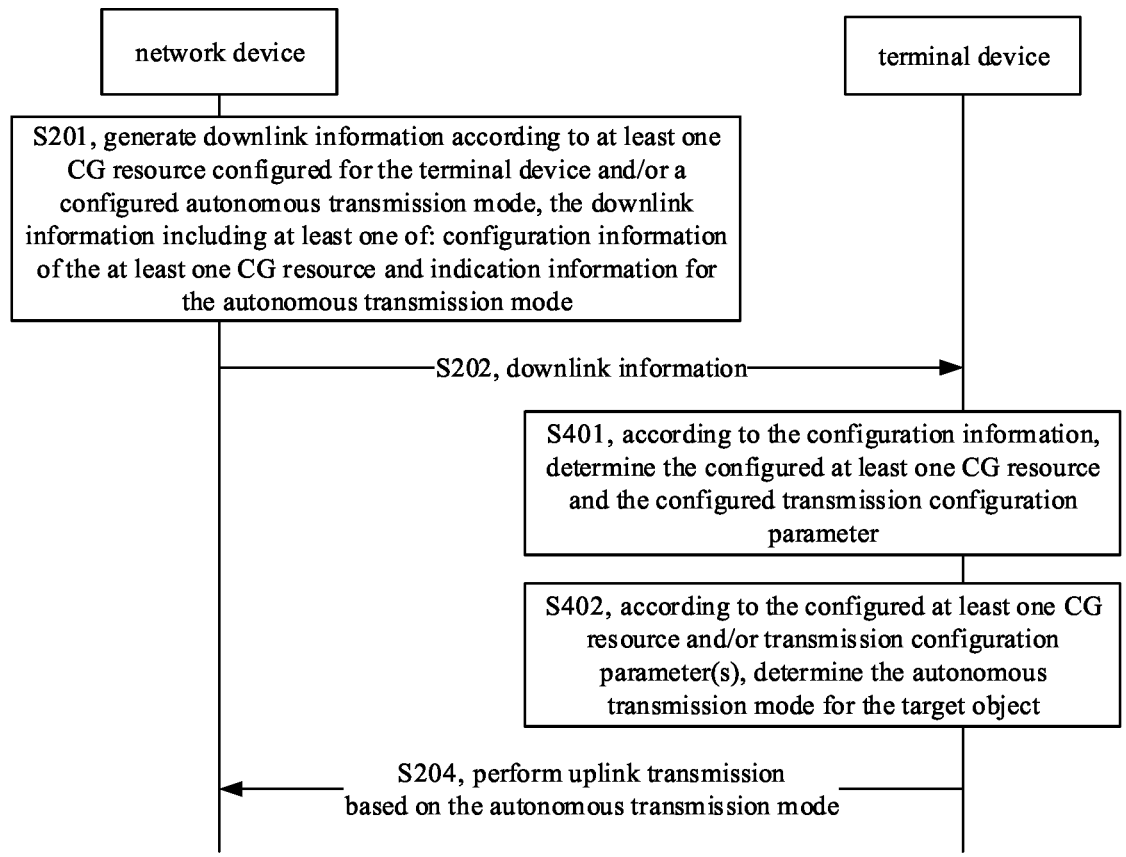
FIG. 4 is a schematic diagram showing interactions in an information transmission method according to a third embodiment of the present disclosure.

Exemplarily, on the basis of the above embodiments, FIG. 4 is a schematic diagram showing interactions in an information transmission method according to a third embodiment of the present disclosure. This embodiment is performed by a terminal device. As shown in FIG. 4, S203 may be implemented by the following steps:

In S401, according to the above configuration information, the configured at least one CG resource and the configured transmission configuration parameter are determined.

In the embodiments of the present disclosure, when the network device configures at least one CG resource for the terminal device, the network device may also configure a transmission configuration parameter corresponding to the autonomous transmission mode and send them to the terminal device through the configuration information. Thus, the terminal device may determine the configured at least one CG resource and the configured transmission configuration parameter based on the configuration information in the downlink information.

Exemplarily, the configured at least one CG resource may be a first CG resource only, a second CG resource only, or the first CG resource and the second CG resource. The configuration information of the at least one CG resource includes the parameter autonomousTX and/or CG-retx timer.

In S402, according to the configured at least one CG resource and/or transmission configuration parameter(s), the autonomous transmission mode for the target object is determined.

Exemplarily, the terminal device may determine the autonomous transmission mode for at least one of the terminal device, each CG resource, and each HARQ process according to the one CG resource or two CG resources configured by the network device, and/or whether the configuration information of the at least one CG resource is a specific configuration parameter, for example, including autonomousTX and/or CG-retx timer.

Exemplarily, when the terminal device is configured with the first CG resource and the second CG resource, the terminal device is configured with and/or supports only the first autonomous transmission mode or the second autonomous retransmission mode. That is, when the terminal device is configured with an NR-U CG resource and a URLLC CG resource, the terminal device is configured with and/or supports only the URLLC CG autonomous transmission mode or the NR-U CG autonomous retransmission mode.

Exemplarily, when the terminal device is configured with the first CG resource and the second CG resource, each CG resource or each HARQ process is configured with and/or supports only the first autonomous transmission mode or the second autonomous retransmission mode. That is, when the terminal device is configured with the NR-U CG resource and the URLLC CG resource, the same CG resource or the same HARQ process is configured with and/or supports only the URLLC CG autonomous transmission mode and the NR-U CG autonomous retransmission mode. However, for this UE, optionally, multiple sets of autonomous transmission modes may be configured at the same time.

Exemplarily, when a terminal device is configured with the first CG resource and the second CG resource, the terminal device restricts the terminal device and/or each CG resource and/or each HARQ process to transmit information according to only one autonomous transmission mode or a combination of both autonomous transmission modes. That is, when the terminal device is configured with the NR-U CG resource and the URLLC CG resource, the terminal device restricts the autonomous transmission mode for the terminal device and/or the same CG resource and/or the same HARQ process to the URLLC CG autonomous transmission mode or the NR-U CG autonomous retransmission mode or a combination of the URLLC CG autonomous transmission mode and the NR-U CG autonomous retransmission mode. In other words, at least one set of transmission mode(s) may be configured, but only one of them is used.

The information transmission mode provided by the embodiments of the present disclosure, the terminal device determines the configured at least one CG resource and the configured transmission configuration parameter(s) according to the above configuration information, and determines the autonomous transmission mode for the target object according to the configured at least one CG resource and/or transmission configuration parameter(s), which lays the foundation for the subsequent uplink transmission by the terminal device.

Figure 5:
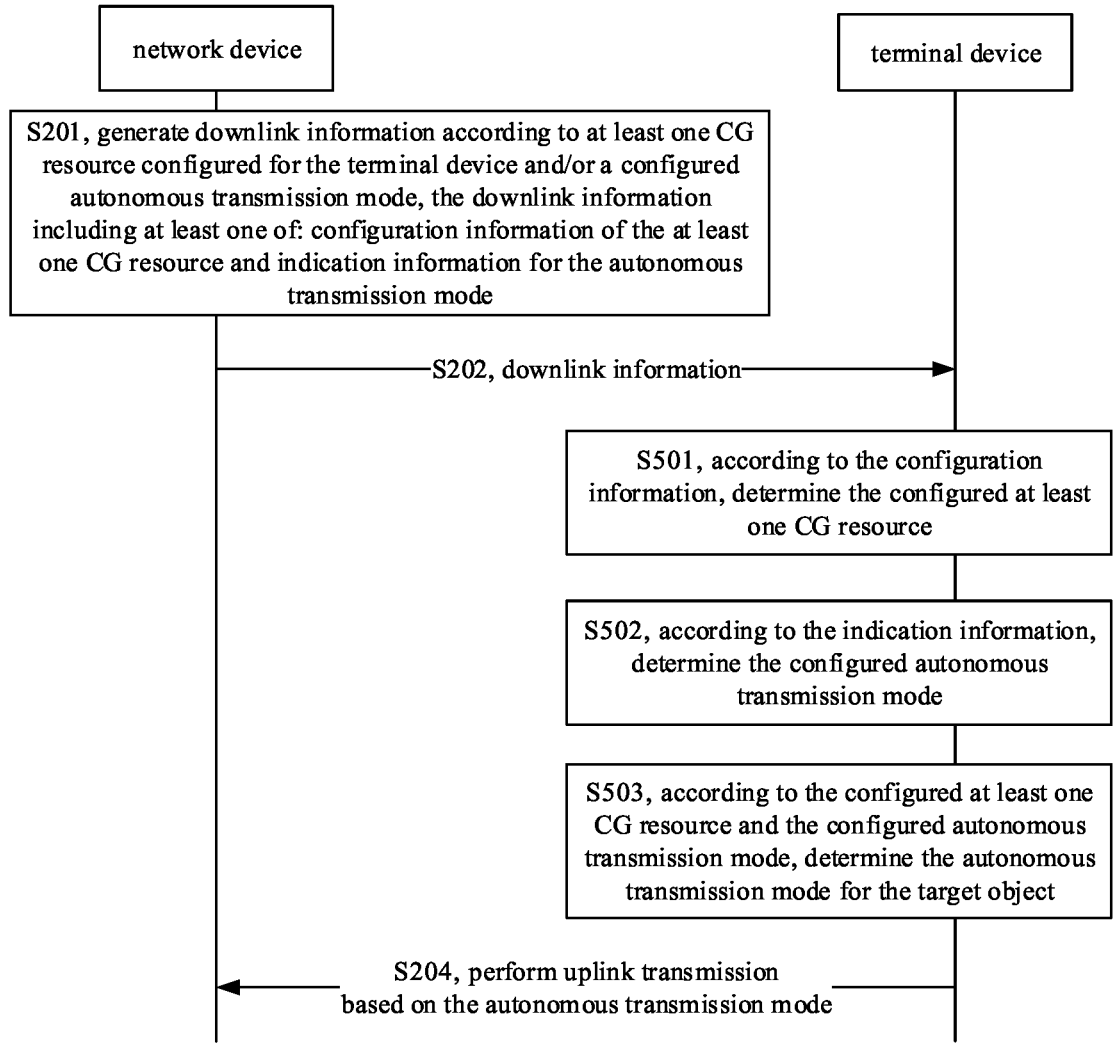
FIG. 5 is a schematic diagram showing interactions in an information transmission method according to a fourth embodiment of the present disclosure.

Exemplarily, on the basis of the above embodiments, FIG. 5 is a schematic diagram showing interactions in an information transmission method according to a fourth embodiment of the present disclosure. This embodiment is performed by a terminal device. As shown in FIG. 5, when the downlink information includes the configuration information of the at least one CG resource and the indication information for the autonomous transmission mode, S203 may be implemented by the following steps:

In S501, according to the configuration information, the configured at least one CG resource is determined.

The specific implementation of this step is consistent with the manner of determining the at least one CG resource according to the configuration information as described in S401 in the embodiment shown in FIG. 4, and repeated descriptions are omitted here.

In S502, according to the indication information, the configured autonomous transmission mode is determined.

In the embodiments of the present disclosure, the network device may configure the autonomous transmission mode via the indication information. Exemplarily, the indication information is received from the network device via broadcast signaling and/or dedicated signaling; alternatively, the indication information is obtained upon receipt of the configuration information of the at least one CG resource.

Exemplarily, the dedicated signaling may be any one of Radio Resource Control (RRC) signaling, Media Access Control Control Control Element (MAC CE), and DCI.

Optionally, the indication information may be a parameter for a single terminal device, a parameter for a single CG resource, a parameter for a single CG resource group, a parameter for a single HARQ process, a parameter for a single MAC entity, or a parameter for a single cell group.

Exemplarily, the configured autonomous transmission mode as indicated by the indication information may be a URLLC CG autonomous transmission mode or a NR-U CG autonomous retransmission mode. Optionally, the configured autonomous transmission mode may be a legacy mode or an enhanced mode. Embodiments of the present disclosure do not limit the specific configured autonomous transmission mode, and the configured autonomous transmission mode may be determined according to the actual scenario, which is not described here.

In S503, according to the configured at least one CG resource and the configured autonomous transmission mode, the autonomous transmission mode for the target object is determined.

Optionally, the terminal device may determine the autonomous transmission mode for the target object based on which specific resource the configured CG resource is, and/or, which autonomous transmission mode the configured autonomous transmission mode is.

Accordingly, in a possible design, S204 may be implemented specifically by the following step:
performing autonomous transmission according to at least one of the configured autonomous transmission mode, the configuration parameter(s) and a varying CG resource.

As an example, if the at least one CG resource configured for the terminal device is the second CG resource, transmission is performed in accordance with the first autonomous transmission mode when the second CG resource or the HARQ process for the second CG resource meets any one of the following conditions: the configured autonomous transmission mode is the first autonomous transmission mode, the second autonomous retransmission mode is not supported, the second autonomous retransmission parameter is not configured, only the first autonomous transmission mode is supported, and only the first autonomous transmission parameter is configured. Accordingly, the autonomous transmission mode for the second CG resource or the HARQ process for the second CG resource is the first autonomous transmission mode.

As another example, if the at least one CG resource configured for the terminal device is the second CG resource, transmission is performed in accordance with the second autonomous transmission mode when the second CG resource or the HARQ process for the second CG resource meets any one of the following conditions: the configured autonomous transmission mode indicated by the indication is the second autonomous retransmission mode, only the second autonomous retransmission mode is supported, only the second autonomous retransmission parameter is configured, the first autonomous transmission mode is not supported, and the first autonomous transmission parameter is not configured. Accordingly, the autonomous transmission mode for the second CG resource or the HARQ process for the second CG resource is the second autonomous retransmission mode.

As a further example, if the configured autonomous transmission mode is the second autonomous transmission mode, the CG resource of the terminal device or the HARQ process for the CG resource meets any one of the following: only the second autonomous retransmission mode is supported, only the second autonomous retransmission parameter is configured, the first autonomous transmission mode is not supported, and the first autonomous transmission parameter is not configured. That is, when the at least one CG resource configured for the terminal device is the first CG resource or the second CG resource (NRU CG or URLLC CG), the autonomous transmission mode for the CG resource of the terminal device or the HARQ process for the CG resource is the second autonomous retransmission mode.

As yet another example, if the configured autonomous transmission mode is the first autonomous transmission mode, the CG resource of the terminal device or the HARQ process for the CG resource meets any one of the following: the second autonomous retransmission mode is not supported, the second autonomous retransmission parameter is not configured, only the first autonomous transmission mode is supported, and only the first autonomous transmission parameter is configured. That is, when the at least one CG resource configured for the terminal device is the first CG resource or the second CG resource (NRU CG or URLLC CG), the autonomous transmission mode for the CG resource of the terminal device or the HARQ process for the CG resource is the first autonomous transmission mode.

In embodiments of the present disclosure, the URLLC CG resource may be configured with the NR-U CG autonomous retransmission mode or the URLLC CG autonomous transmission mode, and the NRU CG resource may be configured with the NR-U CG autonomous retransmission mode or the URLLC CG autonomous transmission mode. Optionally, the configured autonomous transmission mode may be a legacy method or an enhanced method, and details are omitted here, and embodiments of the present disclosure do not impose specific limitations on this.

In another possible design, S204 may be implemented specifically by the following step:
  performing autonomous transmission according to at least one of the configured autonomous transmission mode, configuration parameter(s) and a varying object.

As an example, in a case where different CG resources or different HARQ processes are configured with different autonomous transmission modes, if a CG resource or a HARQ processes corresponding to the CG resource is a second CG resource, the CG resource or the HARQ process for the CG resource meets any one of the following: only the second autonomous retransmission mode is supported, only the second autonomous retransmission parameter is configured, the first autonomous transmission mode is not supported, and the first autonomous transmission parameter is not configured. Accordingly, the autonomous transmission mode for the CG resource or the HARQ process for the CG resource is the second autonomous retransmission mode.

As another example, in a case where different CG resources or different HARQ processes are configured with different autonomous transmission modes, if a CG resource or a HARQ processes corresponding to the CG resource is a second CG resource, the CG resource or the HARQ process for the CG resource meets any one of the following: the second autonomous retransmission mode is not supported, the second autonomous retransmission parameter is not configured, only the first autonomous transmission mode is supported, and only the first autonomous transmission parameter is configured. Accordingly, the autonomous transmission mode for the CG resource or the HARQ process for the CG resource is the first autonomous transmission mode.

As another example, in a case where different CG resources or different HARQ processes are configured with different autonomous transmission modes, if a CG resource or a HARQ processes corresponding to the CG resource is a first CG resource, the CG resource or the HARQ process for the CG resource meets any one of the following: only the second autonomous retransmission mode is supported, only the second autonomous retransmission parameter is configured, the first autonomous transmission mode is not supported, and the first autonomous transmission parameter is not configured. Accordingly, the autonomous transmission mode for the CG resource or the HARQ process for the CG resource is the second autonomous retransmission mode.

As another example, in a case where different CG resources or different HARQ processes are configured with different autonomous transmission modes, if a CG resource or a HARQ processes corresponding to the CG resource is a first CG resource, the CG resource or the HARQ process for the CG resource meets any one of the following: the second autonomous retransmission mode is not supported, the second autonomous retransmission parameter is not configured, only the first autonomous transmission mode is supported, and only the first autonomous transmission parameter is configured. Accordingly, the autonomous transmission mode for the CG resource or the HARQ process for the CG resource is the first autonomous transmission mode.

It is understood that in the embodiments of the present disclosure, the configured autonomous transmission mode may be a legacy method or an enhanced method, and details are omitted here.

In the information transmission mode provided by embodiments of the present disclosure, the terminal device determines the configured at least one CG resource according to the configuration information, determines the configured autonomous transmission mode according to the indication information, and finally determines the autonomous transmission mode for the target object according to the configured at least one CG resource and the configured autonomous transmission mode. In this technical solution, the terminal device determines the autonomous transmission mode for the target object based on the configuration information and the indication information together, and the usable autonomous transmission mode can be accurately determined, thereby laying a foundation for the subsequent implementation of uplink transmission.

Further, on the basis of the above embodiments, when the terminal device is configure with and/or supports only the first CG resource or only the second CG resource, one of the terminal device, each HARQ process, and each CG resource supports and/or is configured with only one autonomous transmission mode. That is, one of the terminal device, each HARQ process, and each CG resource supports and/or is configured with only the URLLC CG autonomous transmission mode or the NR-U CG autonomous retransmission mode.

Exemplarily, in one possible design of the present disclosure, when the terminal device is configured with the first CG resource and the second CG resource and the terminal device supports and/or is configured with multiple autonomous transmission modes simultaneously, each HARQ process and/or each CG resource and/or MAC entity or cell group supports and/or is configured with only one autonomous transmission mode.

Accordingly, S204 (performing an uplink transmission based on the autonomous transmission mode) may be implemented specifically by the following step:
  when the target object is the terminal device or a MAC entity or a cell group, using respective corresponding autonomous transmission mode to perform an uplink transmission for different CG resource groups or CG resources or HARQ processes.

In another possible design of the present disclosure, the terminal device may also meets the following conditions:
  when the terminal device is configured with the first CG resource and the second CG resource, the terminal device is allowed to be configured with multiple autonomous transmission modes at the same time, but only one autonomous transmission mode is allowed to be configured for at least one of different CG resources, MAC entities, cell groups, and HARQ processes; or, when the terminal device is configured with the first CG resource and the second CG resource, for a same HARQ process and/or a same CG resource and/or a same MAC entity and/or a same cell group, the terminal device is allowed to support and/or configured with multiple autonomous transmission modes at the same time.

Accordingly, S204 (performing an uplink transmission based on the autonomous transmission mode) may be implemented specifically by at least one of the following steps:
  performing the uplink transmission in accordance with one of the multiple autonomous transmission modes; and performing the uplink transmission in accordance with both the first autonomous transmission mode and the second autonomous retransmission mode.

Exemplarily, performing the uplink transmission in accordance with one of the plurality of autonomous transmission modes includes any one of the following:

performing the uplink transmission in accordance with the first autonomous transmission mode, i.e., performing the uplink transmission in accordance with the URLLC CG autonomous transmission mode;

performing the uplink transmission in accordance with the second autonomous retransmission mode, i.e., performing the uplink transmission in accordance with the NR-U CG autonomous retransmission mode;

determining the target autonomous transmission mode to be used according to the received indication information or predefined information, and performing the uplink transmission using the target autonomous transmission mode;

performing the uplink transmission using the first autonomous transmission mode when a first unit for the GC resource or HARQ process meets a second condition; and performing the uplink transmission using the second autonomous retransmission mode when the first unit in the GC resource or HARQ process meets a third condition.

The second condition includes at least one of the following that:

transmission of an initial transmission resource for the first unit is not performed or transmission of the initial transmission resource is not completed or transmission of the initial transmission resource fails due to a resource conflict;

transmission of a transmission resource for the first unit is not performed or transmission of the transmission resource is not completed or transmission of the transmission resource fails due to a resource conflict; and the first unit is a deprioritized media access control protocol data unit.

The third condition includes at least one of the following that:

transmission of an initial transmission resource for the first unit is not performed or transmission of the initial transmission resource fails due to a listening failure or receipt of an indication for the listening failure;

transmission of a transmission resource for the first unit is not performed or transmission of the transmission resource fails due to a listening failure or receipt of an indication for the listening failure.

Exemplarily, performing the uplink transmission in accordance with both the first autonomous transmission mode and the second autonomous retransmission mode includes at least one of the following:

performing the uplink transmission at different time moments using the autonomous transmission mode indicated by the network indication information;

performing the uplink transmission in accordance with both the first autonomous transmission mode and the second autonomous retransmission mode when the transmission of the initial transmission resource for the first unit in the CG resource or HARQ process is not performed or transmission of the initial transmission resource is not completed or transmission of the initial transmission resource fails;

for the initial transmission resource for the first unit in the CG resource or HARQ process, if the transmission of the first unit is not performed or the transmission of the first unit is not completed or the transmission of the first unit fails using the first autonomous transmission mode for multiple times, performing information transmission in accordance with the second autonomous retransmission mode, and/or, performing an uplink transmission in accordance with both the first autonomous transmission mode and the second autonomous retransmission mode; and for the initial transmission resource for the first unit in the CG resource or HARQ process, if transmission of the first unit is not performed or the transmission of the first unit is not completed or the transmission of the first unit fails using the second autonomous retransmission mode for multiple times, performing information transmission in accordance with the first autonomous transmission mode, and/or, performing an uplink transmission in accordance with both the first autonomous transmission mode and the second autonomous retransmission mode.

Optionally, the above-mentioned autonomous transmission modes may be legacy modes or may be enhanced modes, and details are omitted here.

It is understood that in the embodiments of the present disclosure, the first unit is a media access control protocol data unit (MAC PDU).

Optionally, in any of the above embodiments of the present disclosure, when the downlink information includes the indication information, the indication information is further used to limit the number of autonomous transmissions in the autonomous transmission mode.

Exemplarily, the number of autonomous transmissions in the autonomous transmission mode is any one of the following:

the number of autonomous transmissions in the first autonomous transmission mode;

the number of autonomous retransmissions in the second autonomous retransmission mode;

a total of number of autonomous transmissions in the first autonomous transmission mode and the number of autonomous retransmissions in the second autonomous retransmission mode.

Further, in embodiments of the present disclosure, the method may further include the step of:

sending, by the network device, scheduling information to the terminal device, the scheduling information being used to indicate transmission or usage information corresponding to the HARQ process or CG resource.

Accordingly, S204 may be implemented by the step of:

performing, by the terminal device, the uplink transmission according to the received scheduling information and the determined autonomous transmission mode.

The scheduling information is information received before an autonomous transmission of a first unit in the HARQ process is performed or the autonomous transmission is successful, and the scheduling information is dynamic scheduling information or downlink feedback information.

As an example, the scheduling information is dynamic scheduling information. Accordingly, performing the uplink transmission according to the scheduling information and the autonomous transmission mode may be implemented by the following steps:

in response to that the dynamic scheduling information is used to indicate scheduling a dynamic grant resource for a new transmission or retransmission, performing, with respect to the HARQ process or the first unit, at least one of the following:

stopping an autonomous transmission corresponding to a first autonomous transmission mode;

stopping a configured grant retransmission timer;

stopping a configured grant timer;

starting the configured grant timer when transmission of the dynamic grant resource is performed; and not starting the configured grant retransmission timer when the transmission of the dynamic grant resource is performed.

As another example, the scheduling information is the downlink feedback information. Accordingly, performing the uplink transmission according to the scheduling information and the autonomous transmission mode may be implemented by the following steps:

in response to that the downlink feedback information is acknowledgement information, performing, with respect to the HARQ process or the first unit, at least one of the following:

stopping an autonomous transmission corresponding to a first autonomous transmission mode;

stopping a configured grant retransmission timer;

stopping a configured grant timer;

in response to that the downlink feedback message is negative acknowledgement information, performing, with respect to the HARQ process or the first unit, at least one of the following:

not stopping the autonomous transmission corresponding to the first autonomous transmission mode;

stopping the configured grant retransmission timer;

not stopping the configured grant timer; and restarting the configured grant retransmission timer when the transmission corresponding to the HARQ process or the first unit is performed.

In addition, in embodiments of the present disclosure, the method may further include:

starting the configured grant retransmission timer when transmission of the first unit in the HARQ process or transmission for the HARQ process corresponding to the CG resource is performed.

Specifically, the configured grant retransmission timer is started when a new transmission or an initial transmission or a previous transmission of the first unit in the HARQ process or a new transmission or an initial transmission or a previous transmission using the HARQ process and/or the first unit of the HARQ process meets a fourth condition.

Optionally, the new transmission or initial transmission or previous transmission of the first unit in the HARQ process or corresponding to the HARQ process includes at least one of the following:

performing the new transmission or initial transmission or previous transmission of the first unit in the HARQ process or for the HARQ process in accordance with the second autonomous retransmission mode; and performing the new transmission or initial transmission or previous transmission of the first unit in the HARQ process or for the HARQ process in accordance with both the first autonomous transmission mode and the second autonomous retransmission mode.

Optionally, the first unit in the HARQ process meeting the fourth condition includes at least one of:

the presence of a deprioritized first unit which has been packetized for the CG resource;

the first unit having been packetized but having not been transmitted or having not been transmitted successfully or transmission of the first unit having not been completed;

the first unit having not been transmitted or having not been transmitted successfully or transmission of the first unit having not been completed due to a resource conflict; and the first unit being a deprioritized media access control protocol data unit.

In embodiments of the present disclosure, the information transmission method may further include the following steps:

setting a state of a HARQ process corresponding to a HARQ entity to a pending state when the HARQ entity obtains the first unit; or setting the state of the HARQ process to the pending state when the HARQ process is configured with a configured grant retransmission timer and the HARQ entity corresponding to the HARQ process obtains the first unit.

In addition, in embodiments of the present disclosure, the information transmission method may further include the following steps:

setting a state of the HARQ process to a pending state when the HARQ process or the CG resource meets a fifth condition and when a HARQ entity corresponding to the HARQ process obtains the first unit.

The fifth condition includes at least one of the following that:

the HARQ process corresponds to the CG resource;

transmission is performed in accordance with a second autonomous retransmission mode;

transmission is performed in accordance with both a first autonomous transmission mode and the second retransmission mode;

the first unit has been packetized but is not transmitted or is not transmitted successfully or transmission of the first unit is completed;

the first unit is not transmitted or is not transmitted successfully or transmission of the first unit is completed due to a resource conflict;

the first unit is a deprioritized media access control session access unit;

the first unit is not transmitted due to a listening failure; and the first unit is not transmitted due to receipt of an indication for the listening failure.

As an example, the first unit being obtained includes at least one of the following:

a resource for transmitting the first unit being one CG resource;

the resource for transmitting the first unit being a high priority resource;

a CG resource for transmitting the first unit being configured with autonomous transmission;

a previous CG resource corresponding to the first unit being deprioritized or in a pending state or the previous CG resource transmission being failed or not being performed due to a listening failure;

a HARQ process corresponding to the first unit being in a pending state; and a CG resource size for transmitting the first unit being the same as a size of the first unit.

In summary, in the information transmission method provided by embodiments of the present disclosure, when the network device configures one kind of CG resource or two kinds of CG resources for the terminal device, the terminal device is able to determine the autonomous transmission mode for at least one of the terminal device, the HARQ process and the CG resource based on the received configuration information of the at least one CG resource and/or the indication information for the autonomous transmission method, and the terminal device can perform an uplink transmission based on the autonomous transmission mode, especially when two kinds of CG resources are set at the same time. The method can harmonize use of the two kinds of CG resources to ensure the information transmission performance between the terminal device and the network device.

The technical solutions of present disclosure will be described in the following by two example implementations.

Example Implementation 1

In an NR-U system supporting URLLC services, for the same UE, when the network device configures both NR-U CG resource(s) and URLLC CG resource(s), or when the network device configures CG resource(s) in accordance with both the URLLC CG mode and the NR-U CG mode, it may be restricted that the same HARQ process and/or CG resource and/or MAC entity and/or cell group and/or HARQ process group and/or CG group may not support multiple autonomous transmission modes. That is, the same HARQ process and/or CG resource and/or MAC entity and/or cell group and/or HARQ process group and/or CG group supports only one autonomous transmission mode. In other words, the network device does not configure multiple autonomous transmission modes or configures only one autonomous transmission mode for the same HARQ process and/or CG resource and/or MAC entity and/or cell group and/or HARQ process group and/or CG group. In this way, the UE may perform transmission in accordance with the autonomous transmission mode.

The specific implementation processes are as follows.

First, when the network device configures one CG resource to the UE or configures multiple CG resources to the UE simultaneously, the network device configures only one autonomous transmission mode for the UE or CG resource or HARQ process.

1. For one UE or one CG resource or HARQ process and/or MAC entity and/or cell group and/or HARQ process group and/or CG group, the network device configures both a NR-U CG resource and a URLLC CG resource.

2. For one UE or one CG resource, when the URLLC CG resource and the NR-U CG resource are configured simultaneously, or, when the CG resources are configured according to both the URLLC CG mode and the NR-U CG mode, for the UE, the UE is restricted from being configured with multiple autonomous transmission modes simultaneously.

Optionally, the multiple autonomous transmission modes include: URLLC CG autonomous transmission mode (i.e., autonomousTX is configured), and NR-U CG autonomous retransmission mode (i.e., CG-retx timer is configured).

3. For one UE or one CG resource, when the NR-U CG resource and the URLLC CG resource are configured simultaneously, or, when the CG resources are configured according to both the URLLC CG mode and the NR-U CG mode, the UE is restricted from being configured with multiple autonomous transmission modes simultaneously for one HARQ process or CG resource and/or MAC entity and/or cell group and/or HARQ process group and/or CG group.

Optionally, the multiple autonomous transmission modes include: URLLC CG autonomous transmission mode (i.e., autonomousTX is configured), and NR-U CG autonomous retransmission mode (i.e., CG-retx timer is configured).

4. The network device indicates the used autonomous transmission mode via first indication information.

Optionally, the first indication information may be indicated to the UE via broadcast/dedicated signaling (any one of RRC, MAC CE, and DCI).

Optionally, the first indication information may be notified to the UE when the CG resource is configured.

Optionally, the first indication information may be an indication parameter per UE, or may be an indication parameter per CG, or may be an indication parameter per CG group, or may be an indication parameter per HARQ process, or may be an indication parameter per HARQ process group, per MAC entity, per cell group, etc., which is not limited in embodiments of the present disclosure.

5. As an example, if the network device configures a NR-U CG resource and a URLLC CG resource for the UE, only one autonomous transmission mode may be configured for the UE. That is, either the URLLC CG autonomous transmission mode (that is, autonomousTX is configured) or the NR-U CG autonomous retransmission mode (that is, CG-retx timer is configured) is configured for the UE. Optionally, the autonomous transmission mode may be a legacy mode or an enhanced mode.

Optionally, if the configured autonomous transmission mode is the URLLC CG autonomous transmission mode and the CG resource configured for the UE is an NR-U CG resource, the CG resource or the HARQ process and/or MAC entity and/or cell group and/or HARQ process group and/or CG group for the CG resource does not support and/or is not configured with autonomous retransmission (i.e., the CG-retx timer is not configured). Alternatively, if the configured autonomous transmission mode is the URLLC CG autonomous transmission mode and the CG resource for the UE is an NR-U CG resource, the CG resource or the HARQ process for the CG resource supports/is configured with autonomous transmission (i.e. autonomousTX is configured).

As an example, if both a NR-U CG resource and a URLLC CG resource are configured for the UE, only one autonomous mode may be configured for one CG resource or HARQ process, i.e. either the URLLC CG autonomous transmission mode (i.e., autonomousTX is configured) or the NR-U CG autonomous retransmission mode (i.e., CG-retx timer is configured) is configured.

Optionally, when configuring different autonomous transmission modes for HARQ processes for different CG resources or CG resources or MAC entities or cell groups or HARQ process groups or CG groups, if the HARQ processes for the CG resources or CG resources are NR-U CG resources, NR-U autonomous retransmission may be configured (i.e., CG-retx timer is configured, autonomousTX is not configured); or, when configuring different autonomous transmission modes for HARQ processes for different CG resources or for CG resources, if the HARQ processes for CG resources or CG resources are NR-U CG resources, URLLC autonomous transmission may be configured (i.e., autonomousTX is configured and CG-retx timer is not configured).

Optionally, when configuring different autonomous transmission modes for HARQ processes for different CG resources or for CG resources, if the HARQ processes for the CG resources or CG resources are URLLC CG resources, NR-U autonomous retransmission may be configured (i.e., CG-retx timer is configured, autonomousTX is not configured); or, when configuring different autonomous transmission modes for HARQ processes for different CG resources or for CG resources, if the HARQ processes for CG resources or CG resources are URLLC CG resources, URLLC autonomous transmission may be configured (i.e., autonomousTX is configured and CG-retx timer is not configured).

Second, the UE receives the CG configuration information sent by the network device and configures corresponding CG resources according to the CG configuration information, and uses the corresponding CG resources for autonomous transmission and/or autonomous retransmission.

Specifically, when autonomous retransmission is supported or configured, the UE first determines whether to use autonomous transmission and the autonomous transmission mode to be used when using the autonomous transmission, based on whether the CG configuration information carries an autonomous transmission parameter, or the received first indication information or a pre-set configuration restriction.

Optionally, if the autonomous transmission restriction is for the UE, the UE uses one autonomous transmission mode for transmission.

If the autonomous transmission restriction is for a CG resource group or a CG resource or a HARQ process or a MAC entity or a cell group or a HARQ process group, for different CG resource groups or CG resources or HARQ processes or MAC entities or cell groups or HARQ process groups, the UE uses a respective corresponding autonomous transmission mode for transmission.

It is to be understood that, on the basis of the above embodiments, if configuring a NR-U CG resource and a URLLC CG resource simultaneously for a same UE is not supported, it is restricted that multiple autonomous transmission modes are not supported for a same HARQ process and/or CG resource and/or UE and/or MAC entity and/or cell group and/or HARQ process group and/or CG group, or that a same HARQ process and/or CG resource supports only one autonomous transmission mode.

In this possible design, the specific autonomous transmission mode is independent of the CG resource configuration mode. That is, when only the NR-U CG resource is configured, only the CG retx timer may be configured, or only the autonomousTX may be configured. Similarly, when only the URLLC CG resource is configured, only the CG retx timer may be configured, or only the autonomousTX may be configured.

In the embodiments of the present disclosure, a method of configuring or supporting the autonomous transmission mode(s) for a UE supporting both a NR-U CG resource and a URLLC CG resource is given. It is restricted in the solution that only one autonomous transmission mode or configuration can be used, which ensures transmission reliability while avoiding complexity for UEs and networks.

Example Implementation 2

In an NR-U system supporting URLLC services, for the same UE, when the network device configures both NR-U CG resources and URLLC CG resources, or when the network device configures CG resources in accordance with both the URLLC CG mode and the NR-U CG mode, if a same HARQ process and/or CG resource supports multiple autonomous transmission modes, the UE perform the transmission behaviors according to a first rule.

The specific implementation processes are as follows.

First, the network device configures one CG resource to the UE or configures multiple CG resources to the UE simultaneously.

1. For one UE or one CG resource or HARQ process or MAC entity or cell group or HARQ process group or CG group, the network device configures both a NR-U CG resource and a URLLC CG resource.

2. For one UE, when the URLLC CG resource and the NR-U CG resource are configured simultaneously, or, when the CG resources are configured according to both the URLLC CG mode and the NR-U CG mode simultaneously, multiple autonomous transmission modes may be configured simultaneously for the UE, but it is restricted that the UE cannot configure multiple autonomous transmission modes simultaneously for one CG resource and/or HARQ process and/or MAC entity and/or cell group and/or HARQ process group and/or CG group.

Optionally, the multiple autonomous transmission modes include: URLLC CG autonomous transmission mode (i.e., autonomousTX is configured), and NR-U CG autonomous retransmission mode (i.e., CG-retx timer is configured).

3. For one UE, when the NR-U CG resource and the URLLC CG resource are configured simultaneously, or, when the CG resources are configured according to both the URLLC CG mode and the NR-U CG mode, for the UE, it is allowed for the UE to configure multiple autonomous transmission modes simultaneously for a same HARQ process or CG resource or MAC entity or cell group or HARQ process group or CG group.

Optionally, the multiple autonomous transmission modes include: URLLC CG autonomous transmission mode (i.e., autonomousTX is configured), and NR-U CG autonomous retransmission mode (i.e., CG-retx timer is configured). Optionally, the included autonomous transmission modes may be exiting modes or enhanced modes.

4. The network device indicates the used autonomous transmission mode via first indication information.

Optionally, the first indication information can be indicated to the UE via broadcast/dedicated signaling (any one of RRC, MAC CE, and DCI).

Optionally, the first indication information may be notified to the UE when the CG resource is configured.

Optionally, the first indication information may be an indication parameter per UE, or may be an indication parameter per CG, or may be an indication parameter per CG group, or may be an indication parameter per HARQ process, or may be an indication parameter per MAC, or may be an indication parameter per HARQ group. Embodiments of the present disclosure do not limit the specific granularity of the rule.

Second, the UE receives the CG configuration information sent by the network device and configures corresponding CG resources according to the CG configuration information, and uses the corresponding CG resources for transmission and/or autonomous retransmission.

Specifically, when autonomous retransmission is supported or configured, the terminal device performs the following behaviors:

1. According to CG configuration information, or first indication information, or configuration restriction, UE determines whether to use autonomous transmission and the autonomous transmission mode to be used when autonomous transmission is used.

2. If the autonomous transmission restriction is for UE, the UE uses a corresponding one autonomous transmission mode to perform transmission for different CG resources or HARQ processes or MAC entities or cell groups or HARQ process groups or CG groups. That is, multiple autonomous transmission modes may be configured simultaneously for the UE, but the UE is restricted from configuring multiple autonomous transmission modes simultaneously for one CG resource and/or HARQ process.

3. For one UE, when the NR-U CG resource and the URLLC CG resource are configured simultaneously, or, when the CG resources are configured according to both the URLLC CG mode and the NR-U CG mode, for the UE, it is allowed for the UE to configure multiple autonomous transmission modes simultaneously for a same HARQ process or CG resource or MAC entity or cell group or HARQ process group or CG group, and the UE performs one of the following behaviors: always performing autonomous transmission according to one of the modes; performing autonomous transmission according to a combination of the two modes.

Exemplarily, always performing autonomous transmission according to one of the modes may be any one of the following:
1) performing transmission according to the URLLC CG autonomous transmission mode;
2) performing transmission according to NR-U CG autonomous retransmission mode;
3) determining whether to use the URLLC CG autonomous transmission mode or the NR-U CG autonomous retransmission mode in accordance with network indication or in accordance with a predefined manner, and performing transmission based on the determined autonomous transmission mode;
4) for a MAC PDU for a CG resource or HARQ process, if the MAC PDU is not transmitted or transmission of the MAC PDU is not completed or transmission of the MAC PDU is not successful due to a resource conflict, or if the MAC PDU is a deprioritized MAC PDU, using the URLLC CG autonomous transmission mode;
optionally, the resource is a resource corresponding to the initial transmission of the MAC PDU;
5) for a MAC PDU for a CG resource or HARQ process, if the MAC PDU corresponding to the resource is not transmitted or transmission of the MAC PDU is not successful due to a LBT failure or receipt of LBT failure indication, using the NR-U CG autonomous retransmission mode; optionally, the resource is a resource corresponding to the initial transmission of the MAC PDU.

Exemplarily, performing autonomous transmission according to a combination of the two modes may be any one of the following.
1) determining to change the autonomous transmission mode according to network indication, i.e., performing transmission using different autonomous transmission modes at different time moments;
2) for a MAC PDU for a CG resource or HARQ process, if the initial transmission of the MAC PDU is not performed or fails or is not completed, using a combination of the URLLC CG autonomous transmission and the NR-U CG autonomous retransmission;
3) for a MAC PDU for a CG resource or HARQ process, if the MAC PDU is not transmitted or transmission of the MAC PDU is not completed or transmission of the MAC PDU is not successful due to a resource conflict, or if the MAC PDU is a deprioritized MAC PDU, using the URLLC CG autonomous transmission mode; optionally, the resource is a resource corresponding to the initial transmission of the MAC PDU;
if M URLLC CG autonomous transmissions for this MAC PDU are not performed or are not completed or fail, using the NR-U CG autonomous retransmission mode or a combination of URLLC CG autonomous transmission mode and NR-U CG autonomous retransmission mode; where M is a positive integer greater than 1;
4) for a MAC PDU for a CG resource or HARQ process, if the MAC PDU corresponding to the resource is not transmitted or transmission of the MAC PDU is not successful due to a LBT failure or receipt of LBT failure indication, using the NR-U CG autonomous retransmission mode; optionally, the resource is a resource corresponding to the initial transmission of the MAC PDU;
if M NR-U CG autonomous retransmissions for this MAC PDU are not performed or fail, using the URLLC CG autonomous transmission mode or a combination of URLLC CG autonomous transmission and NR-U CG autonomous retransmission.

Optionally, in embodiments of the present disclosure, the terminal device may also limit the number of autonomous transmissions.

Exemplarily, the number of URLLC autonomous transmissions may be limited; or, the number of NR-U autonomous retransmissions may be limited; or, the total number of URLLC autonomous transmissions and NR-U autonomous retransmissions may be limited. For example, when the total number of URLLC autonomous transmissions and NR-U autonomous retransmissions is limited, if N (N>M) autonomous transmissions for the MAC PDU fail or are not performed, the autonomous transmission is stopped; where both N and M are positive integers greater than 1.

Optionally, on the basis of the above example implementations 1 and 2, the above rules may be per UE, or the above rules may be per CG, or the above rules may be per CG group, or the above rules may be per HARQ process, or the above rules may be per MAC, or the above rules may be per HARQ group. The embodiments of the present disclosure do not limit the specific granularity of the rules. In addition, the present disclosure may include the following technical solutions:

1) If scheduling information from the network is received before the MAC PDU is automatically transmitted or automatically transmitted successfully, the UE performs transmission following the scheduling indication information. This scheduling information from the network is dynamic scheduling information (new transmission/retransmission dynamic scheduling).

For example, when scheduling a dynamic grant (DG) resource new transmission or retransmission, at least one of the following actions is performed for the HARQ process or for the MAC PDU: stopping autonomous transmission (URLLC autonomous transmission); stopping CG retx timer; and stopping CG timer. When the UE uses a DG resource to perform transmission, the CG retx timer is not started. It is understood that the above descriptions are all actions performed after starting the CG retx timer.

(2) If the scheduling information from the network is received before the MAC PDU is automatically transmitted or automatically transmitted successfully, the UE performs transmission based on the scheduling indication information. The scheduling information from the network may be the downlink feedback information (DFI) indication (A/N feedback).

For example, when the DFI indication is ACK, at least one of the following actions is performed for the HARQ process or for the MAC PDU: stopping autonomous transmission (URLLC autonomous transmission); stopping CG retx timer; and stopping CG timer. When the DFI indication is NACK, at least one of the following actions is performed for the HARQ process or for the MAC PDU: not stopping autonomous transmission (URLLC autonomous transmission); stopping CG retx timer; not stopping CG timer; and restarting CG retx timer when retransmission continues using subsequent resources for the HARQ process or for the MAC PDU. It should be understood that in the above implementations, it is needed to add receiving and processing manners of DFI for URLLC CG resources.

3) The CG retx timer is started when a new transmission or initial transmission is performed for the HARQ process or the CG MAC PDU. The deprioritized resources use the NR-U autonomous retransmission mode to perform transmission, and the CG retx timer is started to avoid that the downlink indication cannot be received; or, the CG retx timer is started when the URLLC autonomous transmission mode is used to avoid that the downlink indication cannot be received.

Further, when transmission is performed in accordance with the NR-U CG autonomous retransmission mode, or, when autonomous transmission is performed in accordance with a combination of the two modes, the CG retx timer is started when a new transmission or initial transmission is performed for the HARQ process or the CG MAC PDU.

Optionally, the CG retx timer is started when at least one of the following conditions is met: there is a MAC PDU which has been packetized for the deprioritized resource; a MAC PDU has been packetized but is not transmitted or is not transmitted successfully or transmission of the MAC PDU is not completed; a MAC PDU is not transmitted or not transmitted successfully or transmission of the MAC PDU is not completed due to a resource conflict; and, a MAC PDU is a deprioritized MAC PDU. Further, the CG timer is started at the same time.

4) For the above CG or HARQ process, if the corresponding HARQ entity obtains the MAC PDU to be transmitted, the HARQ process is set to a pending state. The deprioritized resource uses the NR-U autonomous retransmission mode to perform transmissions.

Further, when transmission is performed in accordance with the NR-U CG autonomous retransmission mode, or when autonomous transmission is performed in accordance with a combination of both modes, for the above CG resource or HARQ process, if the corresponding HARQ entity obtains the MAC PDU to be transmitted, the HARQ process is set to pending.

Exemplarily, the HARQ process is set as pending when at least one of the following conditions is met: the MAC PDU has been packetized but is not transmitted or not successfully transmitted or transmission of the MAC PDU is not completed; the MAC PDU is not transmitted or not successfully transmitted or transmission of the MAC PDU is not completed due to a resource conflict; the MAC PDU is a deprioritized MAC PDU; the MAC PDU is a MAC PDU that is not transmitted due to LBT failure; the MAC PDU is a MAC PDU that is not transmitted due to receipt of a LBT failure indication from the lower layer.

Optionally, the MAC PDU is considered to be obtained when at least one of the following conditions is met. MAC PDU that is not transmitted due to LBT failure may be transmitted by URLLC autonomous transmission mode.

Optionally, the conditions are as follows: the resource corresponding to the MAC PDU is one CG resource; the resource corresponding to the MAC PDU is a prioritized resource; the CG resource is configured with autonomous transmission; a previous CG resource corresponding to the MAC PDU is deprioritized or is pending or is not transmitted or is not transmitted successfully due to LBT failure; the HARQ process corresponding to the MAC PDU is pending; or the current resource size for transmitting the MAC PDU is the same as the MAC PDU size.

In the technical solutions of the present disclosure, when the terminal device is configured with both URLLC CG resources and NR-U CG resources, and the terminal device supports one or more autonomous transmission modes, the terminal device can determine the autonomous transmission mode to be used, so as to harmonize the use of NR-U CG resources and ULRRC CG resources, thus ensuring the information transmission between the terminal device and the network device.

The above describes the example implementations of the information transmission method mentioned in the embodiments of the present disclosure, and the following describes examples of the device embodiments of the present disclosure that can be used to implement the method embodiments of the present disclosure. For details not disclosed in the device embodiments of the present disclosure, please refer to descriptions regarding the method embodiments of the present disclosure.

Figure 6:
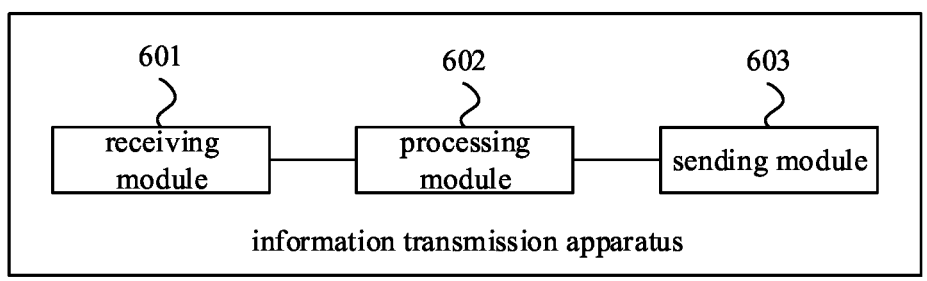
FIG. 6 is a schematic diagram of a structure of an information transmission apparatus according to a first embodiment of the present disclosure.

FIG. 6 is a schematic diagram of a structure of an information transmission apparatus according to a first embodiment of the present disclosure. The apparatus may be integrated in a terminal device, or may be implemented by the terminal device. As shown in FIG. 6, the information transmission apparatus may include a receiving module 601, a processing module 602 and a sending module 603.

The receiving module 601 is configured to receive downlink information from a network device, wherein the downlink information includes at least one of: configuration information of at least one Configured Grant (CG) resource and indication information for an autonomous transmission mode.

The processing module 602 is configured to determine, according to the downlink information, an autonomous transmission mode for a target object, wherein the target object is any one of: a terminal device, a Media Access Control (MAC) entity, a cell group, a Hybrid Automatic Repeat Request (HARQ) process, and a CG resource.

The sending module 603 is configured to perform an uplink transmission based on the autonomous transmission mode.

In a possible design in embodiments of the present disclosure, the sending module 603 is further configured to:
send transmission capability information to the network device;
wherein the transmission capability information includes at least one of:
whether multiple autonomous transmission capabilities are supported simultaneously, and at least one supported autonomous transmission capability.

The at least one supported autonomous transmission capability includes at least one of:
supporting only a first autonomous transmission mode;
supporting only a second autonomous transmission mode; and
supporting the first autonomous transmission mode and the second autonomous transmission mode simultaneously.

Optionally, the transmission capability information is information for any one of the following granularities:
per data resource block, per terminal device, per MAC entity, per cell group, per CG resource, and per HARQ process.

In another possible design in embodiments of the present disclosure, the method further includes at least one of the following:
expecting, by the terminal device, that a same HARQ process and/or CG resource is configured with only one autonomous transmission mode;
expecting, by the terminal device, that a same HARQ process group and/or CG resource group is configured with only one autonomous transmission mode;
expecting, by the terminal device, a same MAC entity or cell group is configured with only one autonomous transmission mode; and
expecting, by the terminal device, that only one autonomous transmission mode is configured.

In another possible design in embodiments of the present disclosure, the autonomous transmission mode for the target object includes any one of the following:
a same HARQ process and/or CG resource being configured with only one autonomous transmission mode;
a same HARQ process group and/or CG resource group being configured with only one autonomous transmission mode;
a same MAC entity or cell group of the terminal device being configured with only one autonomous transmission mode; and
a same terminal device being configured with only one autonomous transmission mode.

Optionally, the configuration information of the at least one CG resource or the autonomous transmission mode for the target object meets at least one of the following:
for a same terminal device or MAC entity or CG resource, a first CG resource and a second CG resource being configured simultaneously;
for a same terminal device or MAC entity or CG resource, the at least one CG resource including both the first CG resource configured in a first mode and the second CG resource configured in a second mode simultaneously;
for a same terminal device or MAC entity or CG resource, performing at least one CG resource transmission in accordance with a first mode and a second mode;
for a same terminal device or MAC entity or CG resource, performing at least one CG resource transmission in accordance with the first mode or the second mode;
for a same terminal device or MAC entity or CG resource, only the first CG resource or the second CG resource being configured;
for a same terminal device or MAC entity or CG resource, the at least one CG resource including the first CG resource configured in the first mode or the second CG resource configured in the second mode.

In another possible design in embodiments of the present disclosure, the processing module 602 is configured to:
determine, according to the configuration information, at least one configured CG resource and/or a configured transmission configuration parameter; and
determine, according to the at least one configured CG resource and the transmission configuration parameter, the autonomous transmission mode for the target object.

As an example, when the terminal device is configured with a first CG resource and a second CG resource, the terminal device is configured with and/or supports only a first autonomous transmission mode or a second autonomous retransmission mode.

As another example, when the terminal device is configured with a first CG resource and a second CG resource, each CG resource or each HARQ process or MAC entity is configured with and/or supports only a first autonomous transmission mode or a second autonomous retransmission mode.

In another possible design in embodiments of the present disclosure, when the downlink information includes the configuration information of the at least one CG resource and the indication information for the autonomous transmission mode, the processing module 602 is configured to:
determine, according to the configuration information, at least one configured CG resource;
determine, according to the indication information, a configured autonomous transmission mode; and
determine, according to the at least one configured CG resource and the configured autonomous transmission mode, the autonomous transmission mode for the target object.

Optionally, the indication information is received from the network device via broadcast signaling and/or dedicated signaling, or, the indication information is obtained upon receipt of the configuration information.

As an example, the sending module 603 is configured to:
perform an autonomous transmission according to the configured autonomous transmission mode and a varying CG resource.

Optionally, in response to that the at least one CG resource configured for the terminal device is a second CG resource, transmission is performed in accordance with a first autonomous transmission mode when the second CG resource or a HARQ process for the second CG resource meets any one of the following conditions that:
the indication information indicates that the configured autonomous transmission mode is the first autonomous transmission mode, a second autonomous retransmission mode is not supported, a second autonomous retransmission parameter is not configured, only the first autonomous transmission mode is supported, and only a first autonomous transmission parameter is configured.

Optionally, in response to that the at least one CG resource configured for the terminal device is the second CG resource, transmission is performed in accordance with a second autonomous transmission mode when the second CG resource or the HARQ process for the second CG resource meets any of the following conditions that:
the indication information indicates that the configured autonomous transmission mode is the second autonomous transmission mode, only the second autonomous retransmission mode is supported, only the second autonomous retransmission parameter is configured, the first autonomous transmission mode is not supported, and the first autonomous transmission parameter is not configured.

Optionally, in response to that the configured autonomous transmission mode is a second autonomous transmission mode, the at least one CG resource for the terminal device or a HARQ process for the at least one CG resource meets any one of the following that:
only a second autonomous retransmission mode is supported, only a second autonomous retransmission parameter is configured, the first autonomous transmission mode is not supported, and the first autonomous transmission parameter is not configured.

Optionally, in response to that the configured autonomous transmission mode is the first autonomous transmission mode, the at least one CG resource for the terminal device or a HARQ process for the at least one CG resource meets any one of the following that:

the second autonomous retransmission mode is not supported, the second autonomous retransmission parameter is not configured, only the first autonomous transmission mode is supported, and only the first autonomous transmission parameter is configured.

In another possible design in embodiments of the present disclosure, the sending module 603 is configured to:

perform an autonomous transmission according to the configured autonomous transmission mode and a varying object.

In another possible design in embodiments of the present disclosure, the processing module 602 is further configured to, prior to determining the autonomous transmission mode for the target object according to the downlink information:

configure, according to the configuration information, corresponding at least one CG resource for the terminal device; and determine whether the target object supports and/or is configured with an autonomous transmission;

wherein the sending module 603 is configured to:

when the target object supports and/or is configured with the autonomous transmission, perform autonomous transmission and/or autonomous retransmission based on the autonomous transmission mode on the at least one CG resource corresponding to the target object.

Optionally, performing the autonomous transmission and/or autonomous retransmission based on the autonomous transmission mode on the at least one CG resource corresponding to the target object, includes:

the sending module 603 being configured to, when the target object is the terminal device, perform the uplink transmission using an autonomous transmission mode configured for the terminal device and/or supported by the terminal device; and when the target object is a CG resource group or the CG resource or the HARQ process or the MAC entity or the cell group, perform the uplink transmission using autonomous transmission modes corresponding to respective objects with respect to different CG resource groups or CG resources or HARQ processes or MAC entities or cell groups.

In another possible design in embodiments of the present disclosure, when the terminal device is configured with only a first CG resource or only a second CG resource and/or the terminal device supports only the first CG resource or only the second CG resource, one of the terminal device, each HARQ process, MAC entity, cell group, and each CG resource supports only one autonomous transmission mode and/or is configured with only one autonomous transmission mode.

In another possible design in embodiments of the present disclosure, when the terminal device is configured with a first CG resource and a second CG resource and the terminal device supports and/or is configured with multiple autonomous transmission modes at the same time, each HARQ process and/or each CG resource and/or MAC entity or cell group is configured with only one autonomous transmission mode.

Optionally, the sending module 603 is configured to:

for different CG resource groups or CG resources or HARQ processes and/or MAC entities and/or cell groups, using respective corresponding autonomous transmission modes to perform the uplink transmission.

In another possible design in embodiments of the present disclosure, the processing module 602 is further configured to:

when the terminal device is configured with a first CG resource and a second CG resource, allowing the terminal device to be configured with multiple autonomous transmission modes at the same time, but only one autonomous transmission mode being allowed to be configured for at least one of different CG resources, MAC entities, cell groups, and HARQ processes; or when the terminal device is configured with the first CG resource and the second CG resource, allowing the terminal device to support and/or be configured with multiple autonomous transmission modes for a same HARQ process and/or a same CG resource and/or a same MAC entity and/or a same cell group.

As an example, the sending module 603 is configured to perform the uplink transmission based on the autonomous transmission mode; the at least one of is included:

performing the uplink transmission in accordance with one of the multiple autonomous transmission modes; and performing the uplink transmission in accordance with both a first autonomous transmission mode and a second autonomous retransmission mode.

Performing the uplink transmission in accordance with one of the multiple autonomous transmission modes includes any one of the following:

performing the uplink transmission in accordance with the first autonomous transmission mode;

performing the uplink transmission in accordance with the second autonomous retransmission mode;

according to the received indication information or predefined information, determining a target autonomous transmission mode to be used and performing the uplink transmission using the target autonomous transmission mode;

performing the uplink transmission using the first autonomous transmission mode when a first unit for the GC resource or HARQ process meets a second condition; and performing the uplink transmission using the second autonomous retransmission mode when the first unit in the GC resource or HARQ process meets a third condition.

Optionally, the second condition includes at least one of the following that:

transmission of an initial transmission resource for the first unit is not performed or transmission of the initial transmission resource is not completed or transmission of the initial transmission resource fails due to a resource conflict;

transmission of a transmission resource for the first unit is not performed or transmission of the initial transmission resource is not completed or transmission of the initial transmission resource fails due to a resource conflict; and the first unit is a deprioritized media access control protocol data unit.

Optionally, the third condition includes at least one of the following that:
  transmission of an initial transmission resource for the first unit is not performed or transmission of the initial transmission resource fails due to a listening failure or receipt of an indication for the listening failure;
  transmission of a transmission resource for the first unit is not performed or transmission of the transmission resource fails due to a listening failure or receipt of an indication for the listening failure.

In another possible design in embodiments of the present disclosure, the receiving module 601 is further configured to:
  receive scheduling information from the network device, wherein the scheduling information is used to indicate transmission or usage information corresponding to the HARQ process or CG resource;
  wherein the sending module 603 is further configured to:
  perform the uplink transmission according to the scheduling information and the autonomous transmission mode.

Optionally, the scheduling information is information received before an autonomous transmission of a first unit in the HARQ process is performed or the autonomous transmission is successful, and the scheduling information is dynamic scheduling information or downlink feedback information.

As an example, the scheduling information is the dynamic scheduling information, and performing the uplink transmission according to the scheduling information and the autonomous transmission mode includes:
  in response to that the dynamic scheduling information is used to indicate scheduling a dynamic grant resource for a new transmission or retransmission, performing, with respect to the HARQ process or the first unit, at least one of the following:
  stopping an autonomous transmission corresponding to a first autonomous transmission mode;
  stopping a configured grant retransmission timer;
  stopping a configured grant timer;
  starting the configured grant timer when transmission of the dynamic grant resource is performed; and
  not starting the configured grant retransmission timer when the transmission of the dynamic grant resource is performed.

As another example, the scheduling information is the downlink feedback information, and performing the uplink transmission according to the scheduling information and the autonomous transmission mode includes:
  in response to that the downlink feedback information is acknowledgement information, performing, with respect to the HARQ process or the first unit, at least one of the following:
  stopping an autonomous transmission corresponding to a first autonomous transmission mode;
  stopping a configured grant retransmission timer;
  stopping a configured grant timer;
  in response to that the downlink feedback message is negative acknowledgement information, performing, with respect to the HARQ process or the first unit, at least one of the following:
  not stopping the autonomous transmission corresponding to the first autonomous transmission mode;
  stopping the configured grant retransmission timer;
  not stopping the configured grant timer; and
  restarting the configured grant retransmission timer when the transmission corresponding to the HARQ process or the first unit is performed.

In another possible design in embodiments of the present disclosure, the processing module 602 is further configured to:
  start the configured grant retransmission timer when transmission of the first unit in the HARQ process or corresponding to the CG resource for the HARQ process is performed.

Optionally, the processing module 602 is configured to:
  start the configured grant retransmission timer when transmission of the first unit for the HARQ process or transmission for the HARQ process corresponding to the CG resource is performed; specifically, the following is included:
  starting the configured grant retransmission timer when a new transmission or an initial transmission or a previous transmission of the first unit in the HARQ process or a new transmission or an initial transmission or a previous transmission for the HARQ process and/or the first unit of the HARQ process meets a fourth condition.

The first unit in the HARQ process meeting the fourth condition includes at least one of:
  the presence of a deprioritized first unit which has been packetized (or generated) for the CG resource;
  the first unit having been packetized but having not been transmitted or having not been transmitted successfully or transmission of the first unit having not been completed;
  the first unit having not been transmitted or having not been transmitted successfully or transmission of the first unit having not been completed due to a resource conflict; and
  the first unit being a deprioritized media access control protocol data unit.

In another possible design in embodiments of the present disclosure, the processing module 602 is further configured to perform one of the following actions:
  setting a state of a HARQ process corresponding to a HARQ entity to a pending state when the HARQ entity obtains the first unit; or
  setting the state of the HARQ process to the pending state when the HARQ process is configured with a configured grant retransmission timer and the HARQ entity corresponding to the HARQ process obtains the first unit.

In another possible design in embodiments of the present disclosure, the processing module 602 is further configured to:
  set a state of the HARQ process to a pending state when the HARQ process or the CG resource meets a fifth condition and when a HARQ entity corresponding to the HARQ process obtains the first unit.

Optionally, the fifth condition includes at least one of the following that:
  the HARQ process corresponds to the CG resource;
  transmission is performed in accordance with a second autonomous retransmission mode;
  transmission is performed in accordance with both a first autonomous transmission mode and the second retransmission mode;
  the first unit has been packetized but is not transmitted or is not transmitted successfully or transmission of the first unit is completed;

the first unit is not transmitted or is not transmitted successfully or transmission of the first unit is completed due to a resource conflict;

the first unit is a deprioritized media access control session access unit;

the first unit is not transmitted due to a listening failure; and the first unit is not transmitted due to receipt of an indication for the listening failure.

Optionally, the first unit being obtained includes at least one of the following:

a resource for transmitting the first unit being one CG resource;

the resource for transmitting the first unit being a high priority resource;

a CG resource for transmitting the first unit being configured with autonomous transmission;

a previous CG resource corresponding to the first unit being deprioritized or in a pending state or the previous CG resource transmission being failed or not being performed due to a listening failure;

a HARQ process corresponding to the first unit being in a pending state; and a CG resource size for transmitting the first unit being the same as a size of the first unit.

The devices provided in the embodiments are used for performing the technical solutions on the terminal device side in the aforementioned method embodiments, and implementation principles and technical effects are similar, which are not repeated here.

Figure 7:
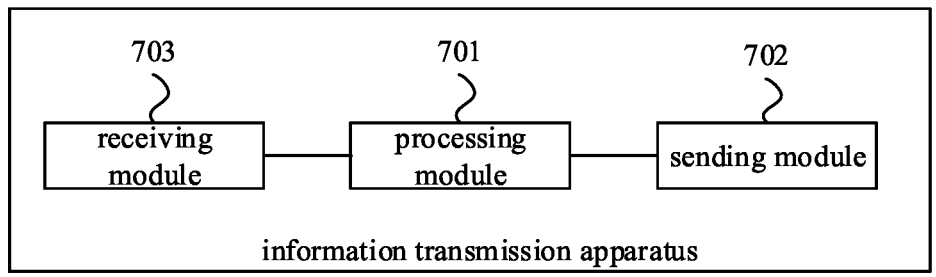
FIG. 7 is a schematic diagram of a structure of an information transmission apparatus according to a second embodiment of the present disclosure.

FIG. 7 is a schematic diagram of a structure of an information transmission apparatus according to a second embodiment of the present disclosure. The apparatus may be integrated in a network device, or may be implemented by the network device. As shown in FIG. 7, the information transmission apparatus may include a processing module 701 and a sending module 702.

The processing module 701 is configured to: generate downlink information according to at least one Configured Grant (CG) resource configured for a terminal device and/or a configured autonomous transmission mode, wherein the downlink information includes at least one of: configuration information of the at least one CG resource and indication information for the autonomous transmission mode.

The sending module 702 is configured to send the downlink information to the terminal device.

In a possible design in embodiments of the present disclosure, the apparatus further includes a receiving module 703.

The receiving module 703 is configured to receive transmission capability information sent from the terminal device, wherein the transmission capability information includes at least one of:

whether multiple autonomous transmission capabilities are supported simultaneously, and at least one supported autonomous transmission capability; and the processing module 701 is further configured to:

configure an autonomous transmission mode for a target object according to the transmission capability information.

Optionally, the at least one supported autonomous transmission capability includes at least one of:

supporting only a first autonomous transmission mode;
supporting only a second autonomous transmission mode; and supporting the first autonomous transmission mode and the second autonomous transmission mode simultaneously.

As an example, the transmission capability information is information for any of the following granularities:

per data resource block, per terminal device, per MAC entity, per cell group, per CG resource, and per HARQ process.

In another possible design in embodiments of the present disclosure, the configured autonomous transmission mode includes any one of the following:

a same HARQ process and/or CG resource of the terminal device being configured with only one autonomous transmission mode;

a same HARQ process group and/or CG resource group of the terminal device being configured with only one autonomous transmission mode;

a same MAC entity or cell group of the terminal device being configured with only one autonomous transmission mode; and the terminal device being configured with only one autonomous transmission mode.

Optionally, the configuration information of the at least one CG resource or the autonomous transmission mode for the target object meets at least one of the following:

for a same terminal device or MAC entity or CG resource, a first CG resource and a second CG resource being configured simultaneously;

for a same terminal device or MAC entity or CG resource, the at least one CG resource c including both the first CG resource configured in a first mode and the second CG resource configured in a second mode simultaneously;

for a same terminal device or MAC entity or CG resource, performing at least one CG resource transmission in accordance with a first mode and a second mode;

for a same terminal device or MAC entity or CG resource, performing at least one CG resource transmission in accordance with the first mode or the second mode;

for a same terminal device or MAC entity or CG resource, only the first CG resource or the second CG resource being configured;

for a same terminal device or MAC entity or CG resource, the at least one CG resource including the first CG resource configured in the first mode or the second CG resource configured in the second mode.

In another possible design in embodiments of the present disclosure, the indication information is sent via broadcast signaling and/or dedicated signaling, or, the indication information is sent when the configuration information is sent.

In another possible design in embodiments of the present disclosure, when a first CG resource and a second CG resource are configured for the terminal device, only a first autonomous transmission mode or a second autonomous retransmission mode is configured for the terminal device.

In another possible design in embodiments of the present disclosure, when a first CG resource and a second CG resource are configured for the terminal device, only a first autonomous transmission mode or a second autonomous retransmission mode is configured for each CG resource or each HARQ process or MAC entity.

In another possible design in embodiments of the present disclosure, when only a first CG resource or only a second CG resource is configured for the terminal device, only one autonomous transmission is configured for one of the terminal device, each HARQ process and each CG resource.

In another possible design in embodiments of the present disclosure, when a first CG resource and a second CG resource are configured for the terminal device, multiple autonomous transmission modes are configured simultaneously for the terminal device.

In another possible design in embodiments of the present disclosure, the sending module 702 is further configured to:
send scheduling information to the terminal device, wherein the scheduling information is used to indicate transmission or usage information corresponding to the HARQ process or CG resource.

The scheduling information is information received before an autonomous transmission of a first unit in the HARQ process is performed or the autonomous transmission is successful, and the scheduling information is dynamic scheduling information or downlink feedback information.

The devices provided in the embodiments are used for performing the technical solutions on the network device side in the aforementioned method embodiments, and implementation principles and technical effects are similar, which are not repeated here.

It should be noted that that the above division of the modules in the device embodiments is only a logical functional division, and in actual implementations, the modules may be fully or partially integrated into a physical entity, or may be physically separated. The modules may all be implemented in the form of software calling processing elements; alternatively, the modules may also all be implemented in the form of hardware; alternatively, the modules may be partially implemented in the form of software calling processing elements and partially implemented in the form of hardware. For example, the processing module may be a separately established processing element or may be integrated in one of chips of the above devices for implementation, or the processing module may also be stored in the memory of the above devices in the form of program codes, which are called by one of the processing elements of the above devices to perform the functions of the above determination module. Other modules are implemented in a similar way. Furthermore, all or some of these modules may be integrated together or may be implemented independently. The processing element described here may be an integrated circuit with a signal processing capability. In implementation, the steps of the above methods or each of the above modules may be accomplished by integrated logic circuits in hardware in a processor element or by instructions in the form of software.

Figure 8:
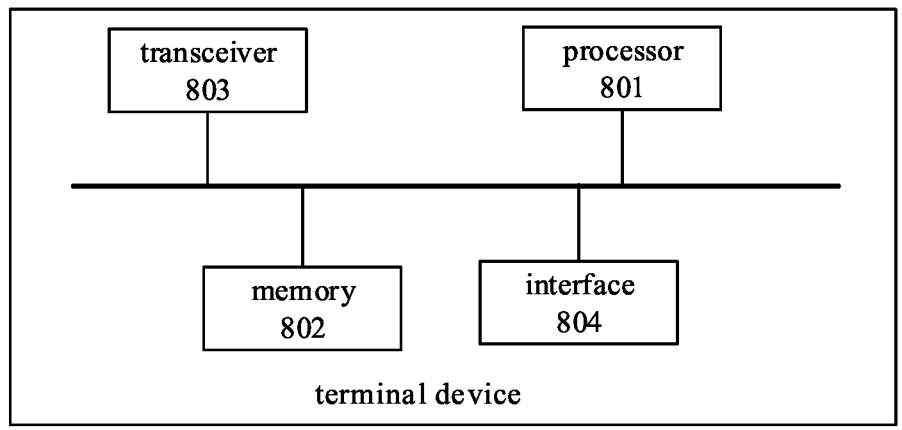
FIG. 8 is a schematic diagram of a structure of a terminal device according to an embodiment of the present disclosure.

FIG. 8 is a schematic diagram of a structure of a terminal device according to an embodiment of the present disclosure. As shown in FIG. 8, the terminal device may include: a processor 801, a memory 802, a receiver 803, and an interface 804 for communication with a network device.

The memory 802 stores computer executable instructions.

The processor 801 executes the computer executable instructions stored in the memory 802, so that the processor 801 performs the technical solutions on the terminal device side in the foregoing method embodiments.

Figure 9:
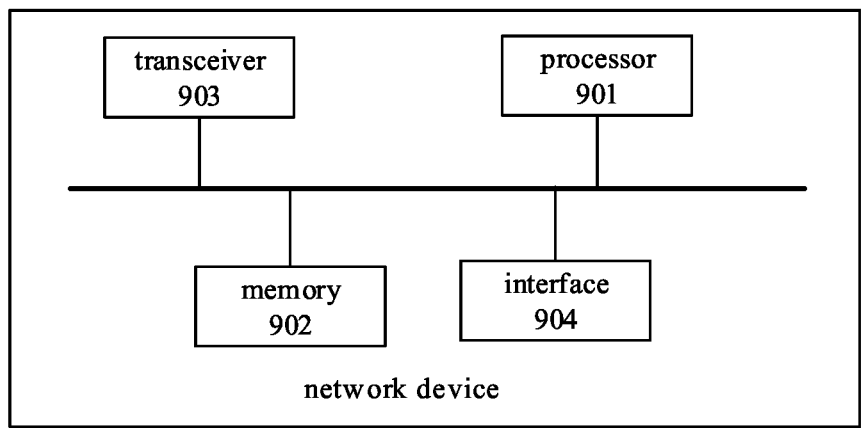
FIG. 9 is a schematic diagram of a structure of a network device according to an embodiment of the present disclosure.

FIG. 9 is a schematic diagram of a structure of a network device according to an embodiment of the present disclosure. As shown in FIG. 9, the network device may include: a processor 901, a memory 902, a transmitter 903, and an interface 904 for communication with the terminal device.

The memory 902 stores computer executable instructions.

The processor 901 executes the computer executable instructions stored in the memory 902, so that the processor 901 performs the technical solutions on the network device side in the foregoing method embodiments.

It should be understood that the processor in embodiments of the present disclosure may be an integrated circuit chip having a signal processing capability. In implementations, the steps of the method embodiments described above may be implemented by integrated logic circuitry in the hardware in the processor or by instructions in the form of software. The processor described above may be a general purpose processor, a Digital Signal Processor (DSP), an Application Specific Integrated Circuit (ASIC), a Field Programmable Gate Array (FPGA) or other programmable logic device, discrete gate or transistor logic device, or discrete hardware component.

It will be appreciated that the memory in embodiments of the present disclosure may be a volatile memory or a non-volatile memory, or may include both a volatile and a non-volatile memory. The non-volatile memory may be a Read-Only Memory (ROM), a Programmable ROM (PROM), an Erasable Programmable Read-Only Memory (EPROM), an Electrically Erasable Programmable Read-Only Memory (EEPROM), or a flash memory. The volatile memory may be a Random Access Memory (RAM), which is used as an external cache.

Figure 10:
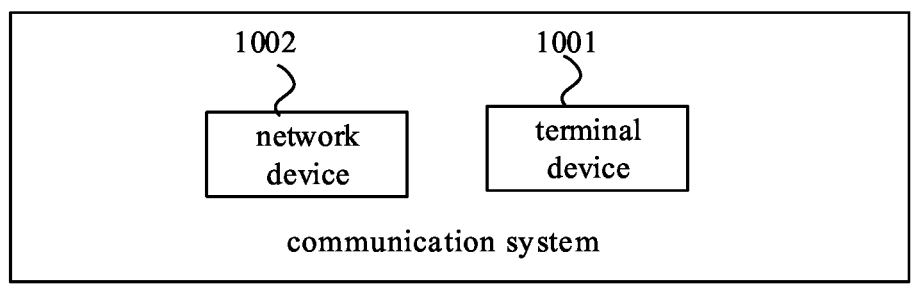
FIG. 10 is a schematic block diagram of a communication system according to an embodiment of the present disclosure.

FIG. 10 is a schematic block diagram of a communication system according to an embodiment of the present disclosure. As shown in FIG. 10, the communication system 1000 includes a terminal device 1001 and a network device 1002.

The terminal device 1001 may be used to implement the corresponding functions implemented by the terminal device in the method embodiments described above, and the network device 1002 may be used to implement the corresponding functions implemented by the network device in the method embodiments described above. The specific implementation principles and beneficial effects of the terminal device and the network device may be found in the above-described embodiments and will not be repeated herein.

An embodiment of the present disclosure further provides a computer readable storage medium. The computer readable storage medium in which computer execution instructions are stored, when the computer execution instructions are executed by a processor for implementing the technical solution on the terminal device side of the above method embodiment.

An embodiment of the present disclosure further provides a computer-readable storage medium having computer executable instructions stored thereon, wherein when the computer executable instructions are executed by a processor, the processor is caused to perform technical solutions on the terminal device side in the above method embodiments.

An embodiment of the present disclosure further provides a computer-readable storage medium having computer executable instructions stored thereon, wherein when the computer executable instructions are executed by a processor, the processor is caused to perform technical solutions on the network device side in the above method embodiments.

An embodiment of the present disclosure further provides a program. When the program is executed by a processor, the processor is caused to perform technical solutions on the terminal device side in the above method embodiments.

An embodiment of the present disclosure further provides a program. When the program is executed by a processor, the processor is caused to perform technical solutions on the network device side (base station) in the above method embodiments.

An embodiment of the present disclosure further provides a computer program product including program instructions for implementing the technical solutions on the terminal device side in the above method embodiments.

An embodiment of the present disclosure further provides a computer program product including program instructions for implementing the technical solutions on the network device side (base station) in the above method embodiments.

An embodiment of the present disclosure further provides a chip including: a processing module and a communication interface. The processing module is configured to implement the technical solutions on the terminal device side in the above method embodiments.

Further, the chip includes a storage module (e.g., memory). The storage module is used to store instructions, the processing module is used to execute the instructions stored in the storage module, and execution of the instructions stored in the storage module causes the processing module to execute the technical solutions on the terminal device side in the above method embodiments.

An embodiment of the present disclosure further provides a chip including: a processing module and a communication interface. The processing module is configured to implement the technical solutions on the network device side in the above method embodiments.

Further, the chip includes a storage module (e.g., memory). The storage module is used to store instructions, the processing module is used to execute the instructions stored in the storage module, and execution of the instructions stored in the storage module causes the processing module to execute the technical solutions on the network device side in the above method embodiments.

In embodiments of the present disclosure, it should be understood that the disclosed systems, apparatuses, and methods may be implemented in other ways. For example, the device embodiments described above are merely schematic. For example, the division of the units described herein is only a logical functional division, and the units may be divided in another way in actual implementations. For example, multiple units or components may be combined or can be integrated into another system, or some features may be ignored, or not implemented. On another point, the mutual coupling or direct coupling or communication connection shown or discussed may be indirect coupling or communication connection through some interface(s), device(s) or unit(s), which may be electrical, mechanical or other forms.

In the above example implementations of user equipment and network devices, it should be understood that the processor may be a Central Processing Unit (CPU), or may be other general purpose processor, Digital Signal Processor (DSP), Application Specific Integrated Circuit (ASIC), etc. The general-purpose processor may be a microprocessor or the processor may also be any conventional processor, etc. The steps in the methods of embodiments of the present disclosure may be directly embodied as being implemented by a hardware processor, or may be implemented by a combination of hardware and software modules in the processor.

All or some of the steps of each of the method embodiments described above may be implemented by program instructions related hardware associated with program instructions. The aforementioned program may be stored in a readable memory. The program, when executed, performs the steps including each of the method embodiments described above. The aforementioned memory (storage medium) includes: a Read-Only Memory (ROM), RAM, a flash memory, a hard disk, a solid state drive, a magnetic tape, a floppy disk, an optical disc and any combination thereof.

What is claimed is:

1. An information transmission method, comprising:
   receiving, by a terminal device, downlink information from a network device, wherein the downlink information comprises configuration information of at least one Configured Grant (CG) resource, wherein the terminal device is allowed to be configured with multiple autonomous transmission modes simultaneously for a same CG resource;
   determining, by the terminal device, according to the downlink information, an autonomous transmission mode for a CG resource; and
   performing, by the terminal device, an uplink transmission based on the autonomous transmission mode;
   wherein performing the uplink transmission based on the autonomous transmission mode comprises:
   performing the uplink transmission based on one autonomous transmission mode of multiple autonomous transmission modes;
   wherein performing the uplink transmission based on the one autonomous transmission mode of multiple autonomous transmission modes comprises any one of:
   performing the uplink transmission using a first autonomous transmission mode in response to a Media Access Control Protocol Data Unit (MAC PDU) for the CG resource meeting a second condition; or
   performing the uplink transmission using a second autonomous retransmission mode in response to the MAC PDU for the GC CG resource meeting a third condition.

2. The method according to claim 1, wherein determining, according to the downlink information, the autonomous transmission mode for the CG resource comprises:
   determining, according to the configuration information, at least one configured CG resource and a configured transmission configuration parameter; and
   determining, according to at least one of the at least one configured CG resource or the transmission configuration parameter, the autonomous transmission mode for the CG resource.

3. The method according to claim 1,
   wherein performing the uplink transmission based on the autonomous transmission mode further comprises:
   performing the uplink transmission in accordance with both the first autonomous transmission mode and the second autonomous retransmission mode.

4. The method according to claim 1, wherein performing the uplink transmission based on one autonomous transmission mode of multiple autonomous transmission modes comprises:
   determining, according to received indication information or predefined information, determining a target autonomous transmission mode to be used and performing the uplink transmission using the target autonomous transmission mode.

5. An information transmission method, comprising:
   Generating, by a network device, downlink information according to an autonomous transmission mode configured for at least one Configured Grant (CG) resource configured for a terminal device, wherein the downlink information comprises configuration information of the at least one CG resource, wherein the terminal device is allowed to be configured with multiple autonomous transmission modes simultaneously for a same CG resource, wherein the autonomous transmission mode is used for the terminal device to perform an uplink transmission;

wherein a first autonomous transmission mode is used for the terminal device to perform the uplink transmission in response to a Media Access Control Protocol Data Unit (MAC PDU) for the CG resource meeting a second condition; or a second autonomous retransmission mode is used for the terminal device to perform the uplink transmission in response to the MAC PDU for the CG resource meeting a third condition; and sending, by the network device, the downlink information to the terminal device.

6. A terminal device, comprising:

a processor; and a memory storing instructions executable by the processor;

wherein when the instructions are executed by the processor, the terminal device is caused to:

receive downlink information from a network device, wherein the downlink information comprises configuration information of at least one Configured Grant (CG) resource, wherein the terminal device is allowed to be configured with multiple autonomous transmission modes simultaneously for a same CG resource;

determine, according to the downlink information, an autonomous transmission mode for a CG resource; and perform an uplink transmission based on the autonomous transmission mode;

wherein performing the uplink transmission based on the autonomous transmission mode comprises:

performing the uplink transmission based on one autonomous transmission mode of multiple autonomous transmission modes;

wherein performing the uplink transmission based on the one autonomous transmission mode of multiple autonomous transmission modes comprises any one of:

performing the uplink transmission using a first autonomous transmission mode in response to a Media Access Control Protocol Data Unit (MAC PDU) for the CG resource meeting a second condition; or performing the uplink transmission using a second autonomous retransmission mode in response to the MAC PDU for the CG resource meeting a third condition.

7. The method according to claim 1, wherein the second condition comprises at least one of the following that:

transmission of an initial transmission resource for the MAC PDU is not performed or transmission of the initial transmission resource is not completed or transmission of the initial transmission resource fails due to a resource conflict;

transmission of a transmission resource for the MAC PDU is not performed or transmission of the transmission resource is not completed or transmission of the transmission resource fails due to a resource conflict; or the MAC PDU is a deprioritized MAC PDU.

8. The method according to claim 1, wherein the third condition comprises at least one of the following that:

transmission of an initial transmission resource for the MAC PDU is not performed or transmission of the initial transmission resource fails due to a listening failure or receipt of an indication for the listening failure; or transmission of a transmission resource for the MAC PDU is not performed or transmission of the transmission resource fails due to a listening failure or receipt of an indication for the listening failure.

9. The method according to claim 5, further comprising:

receiving transmission capability information sent from the terminal device, wherein the transmission capability information comprises at least one of:

whether multiple autonomous transmission capabilities are supported simultaneously, or at least one supported autonomous transmission capability; and configuring an autonomous transmission mode for a target object according to the transmission capability information.

10. The terminal device according to claim 6, wherein when the instructions are executed by the processor, the terminal device is caused to:

determine, according to the configuration information, at least one configured CG resource and a configured transmission configuration parameter; and determine, according to at least one of the at least one configured CG resource or the transmission configuration parameter, the autonomous transmission mode for the CG resource.

11. The terminal device according to claim 6, wherein when the instructions are executed by the processor, the terminal device is caused to:

performing the uplink transmission in accordance with both the first autonomous transmission mode and the second autonomous retransmission mode.

12. The terminal device according to claim 6, when the instructions are executed by the processor, the terminal device is caused to:

determine, according to received indication information or predefined information, determining a target autonomous transmission mode to be used and performing the uplink transmission using the target autonomous transmission mode.

13. The terminal device according to claim 6, wherein the second condition comprises at least one of the following that:

transmission of an initial transmission resource for the MAC PDU is not performed or transmission of the initial transmission resource is not completed or transmission of the initial transmission resource fails due to a resource conflict;

transmission of a transmission resource for the MAC PDU is not performed or transmission of the transmission resource is not completed or transmission of the transmission resource fails due to a resource conflict; or the MAC PDU is a deprioritized MAC PDU.

14. The terminal device according to claim 6, wherein the third condition comprises at least one of the following that:

transmission of an initial transmission resource for the MAC PDU is not performed or transmission of the initial transmission resource fails due to a listening failure or receipt of an indication for the listening failure; or transmission of a transmission resource for the MAC PDU is not performed or transmission of the transmission resource fails due to a listening failure or receipt of an indication for the listening failure.

* * * * *